United States Patent
Hwang et al.

(10) Patent No.: US 9,894,407 B2
(45) Date of Patent: Feb. 13, 2018

(54) APPARATUS FOR TRANSRECEIVING SIGNALS AND METHOD FOR TRANSRECEIVING SIGNALS

(71) Applicant: LG ELECTRONICS INC., Seoul (KR)

(72) Inventors: Soojin Hwang, Seoul (KR); Jinpil Kim, Seoul (KR); Jongyeul Suh, Seoul (KR); Jeehyun Choe, Seoul (KR)

(73) Assignee: LG ELECTRONICS INC., Seoul (KR)

(*) Notice: Subject to any disclaimer, the term of this patent is extended or adjusted under 35 U.S.C. 154(b) by 340 days.

(21) Appl. No.: 14/408,226

(22) PCT Filed: Nov. 6, 2013

(86) PCT No.: PCT/KR2013/010014
§ 371 (c)(1),
(2) Date: Dec. 15, 2014

(87) PCT Pub. No.: WO2014/073853
PCT Pub. Date: May 15, 2014

(65) Prior Publication Data
US 2015/0124888 A1 May 7, 2015

Related U.S. Application Data

(60) Provisional application No. 61/723,771, filed on Nov. 7, 2012.

(51) Int. Cl.
*H04N 21/434* (2011.01)
*H04N 19/44* (2014.01)
(Continued)

(52) U.S. Cl.
CPC ...... *H04N 21/434* (2013.01); *H04N 19/44* (2014.11); *H04N 19/46* (2014.11); *H04N 21/236* (2013.01);
(Continued)

(58) Field of Classification Search
None
See application file for complete search history.

(56) References Cited

U.S. PATENT DOCUMENTS 6,535,688 B1    3/2003  Kawamura et al.
7,020,195 B1 *  3/2006  McMahon ........... H04N 5/4401
                                                    348/E5.108
(Continued)

FOREIGN PATENT DOCUMENTS

CN    1717930 A    1/2006
CN  102547326 A    7/2012
(Continued)

OTHER PUBLICATIONS

Wiegand et al. ("WD1: Working Draft 1 of High-Efficiency Video Coding" ITU-T Oct. 2010).*

*Primary Examiner* — Kate Luo
(74) *Attorney, Agent, or Firm* — Dentons US LLP

(57) ABSTRACT

The present invention relates to an apparatus for transreceiving signals and a method for transreceiving signals. One embodiment of the present invention provides a method for transmitting signals comprising the steps of: encoding video data; generating signaling information which signals displaying the encoded video data so as to fit the screen ratio of a receiver, wherein the signaling information includes screen ratio control information for displaying high-resolution video data of a first screen ratio regardless of the screen ratio of the receiver; and multiplexing the encoded video
(Continued)

data and the signaling information and transmitting the multiplexed video data and the signaling information.

6 Claims, 28 Drawing Sheets

(51) Int. Cl.
    *H04N 21/236*     (2011.01)
    *H04N 19/46*     (2014.01)
    *H04N 21/2343*     (2011.01)
    *H04N 21/6336*     (2011.01)
    *H04N 19/33*     (2014.01)

(52) U.S. Cl.
    CPC ........... *H04N 21/23614* (2013.01); *H04N 21/234372* (2013.01); *H04N 21/4348* (2013.01); *H04N 21/6336* (2013.01); *H04N 19/33* (2014.11)

(56) References Cited

U.S. PATENT DOCUMENTS

| | | | |
|---|---|---|---|
| 2004/0150747 A1* | 8/2004 | Sita | H04N 21/4621 348/558 |
| 2008/0002776 A1* | 1/2008 | Borer | H04N 21/23424 375/240.26 |
| 2008/0036907 A1 | 2/2008 | Umei et al. | |
| 2008/0181582 A1 | 7/2008 | Chung et al. | |
| 2009/0238479 A1* | 9/2009 | Jaggi | H04N 19/172 382/236 |
| 2010/0225669 A1 | 9/2010 | Park | |
| 2010/0325676 A1* | 12/2010 | Kim | H04N 21/238 725/105 |
| 2012/0076204 A1* | 3/2012 | Raveendran | H04N 21/23432 375/240.12 |
| 2012/0183060 A1* | 7/2012 | Hong | H04N 19/70 375/240.12 |

FOREIGN PATENT DOCUMENTS

| | | |
|---|---|---|
| EP | 1806730 A1 | 7/2007 |
| EP | 2228788 A1 | 9/2010 |
| JP | 09-051501 A | 2/1997 |
| JP | 2006-106371 A | 4/2006 |
| KR | 100217178 B1 | 9/1999 |
| KR | 10-2007-0052584 A | 5/2007 |
| KR | 10-2007-0120304 A | 12/2007 |
| KR | 10-2008-0008071 A | 1/2008 |

\* cited by examiner

FIG. 4
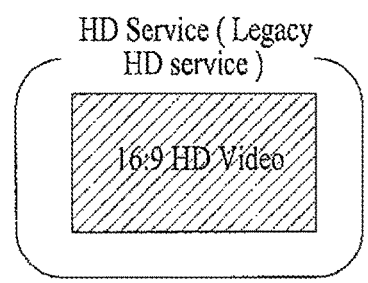
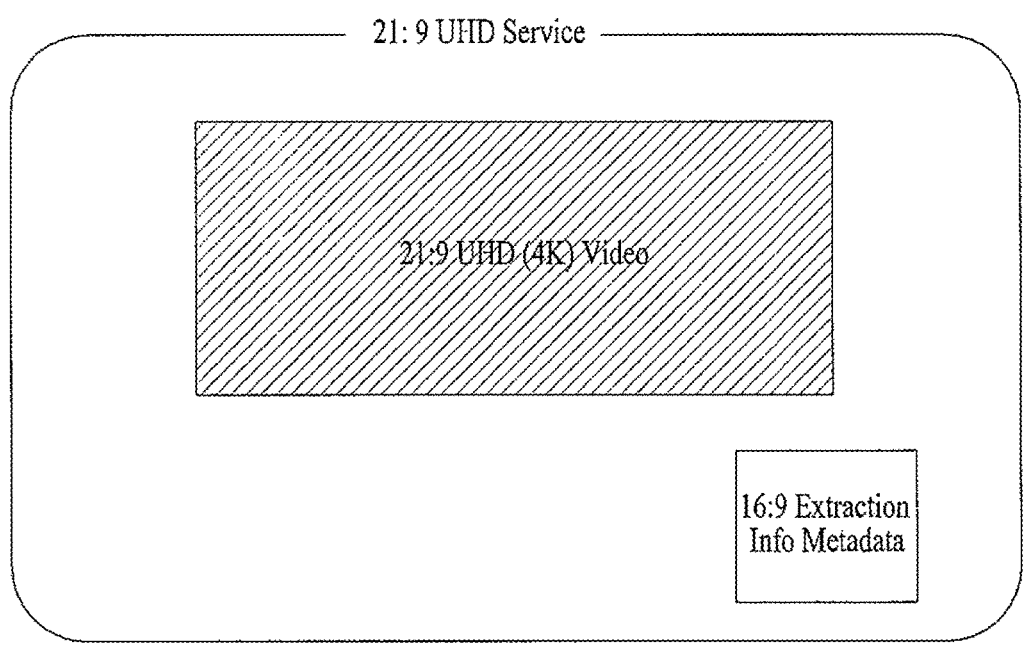

FIG. 11
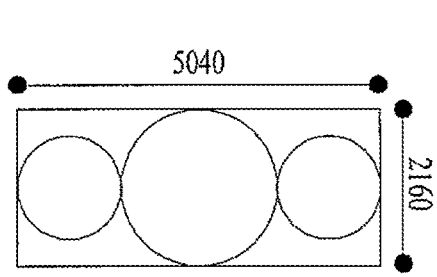
(a) 21:9 UHD original image resolution
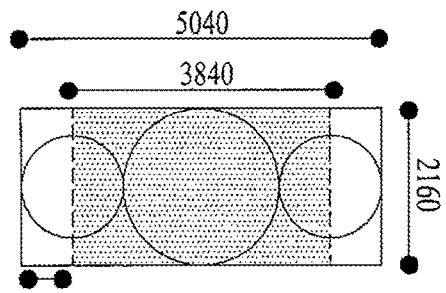
(b) Resolution of 16:9 image of 21:9 UHD original image and remaining additional image
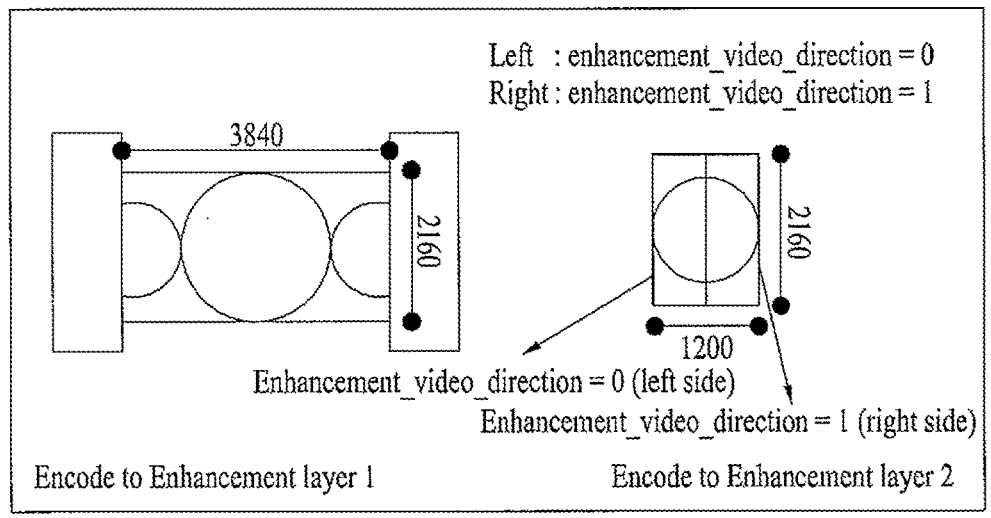
(c) Enhancement layer 1 and 2

FIG. 16

| Syntax | No. of bits | Mnemonic |
|---|---|---|
| TS_program_map_section ( ) { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for (i=0; i< N; i++) { | | |
|         descriptor( ) | | |
|     } | | |
|     for (i=0; i< N1; i++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for (i=0; i< N2; i++) { | | |
|             descriptor( ) | | |
|         } | | |
|     } | | |
|     CRC_32 | 32 | rpchof |
| } | | |

UHD composition descriptor position – Information on enhancement layer 2 video element (descriptor respective to base layer video element and enhancement layer 1 video element described in already-existing patent)

| Syntax | No. of bits | Format |
|---|---|---|
| UHD_program_type_descriptor | | |
|     descriptor_tag | 8 | uimsbf |
|     offset_beta_value | 2 | uimsbf |
|     UHD_program_format_type | 8 | |
| } | | |

0x01 – 16:9 HD compatible, 16:9 UHD compatible, configure remaining area for 21:9 video configuration as separate layer (First embodiment)
0x02 – 21:9 video format, include crop information for 16:9 display (Second embodiment)
0x03 – 16:9 video format, include AFD/Bar information for 21:9 display (Third embodiment)

FIG. 17

| Syntax | Description |
|---|---|
| Program map section ( ) { | |
| . | |
| . | |
| . | |
| program_number | Program including 21:9 UHD video |
| . | |
| . | |
| . | |
| stream_type | 0x02 (MPEG-2 Video Codec) |
| elementary_PID | 0x019A |
| descriptor ( ) | Descriptor related to MPEG-2 |
| stream_type | 0xA1 (HEVC scalable layer video codec) |
| elementary_PID | 0 x 109B |
| UHDTV_sub_stream_descriptor ( ) | Information related to EL1 and Information required for configuring 16:9 UHD image using base layer |
| stream_type | 0xA2 (HEVC video codec) |
| elementary_PID | 0 x 109C |
| UHD_compositon_descriptor ( ) | Information related to EL2 and Information for recovering 21:9 UHD image |
| . | |
| . | |
| . | |
| } | |

FIG. 18

| Syntax | No. of bits | Format |
|---|---|---|
| UHD_composition_descriptor ( ) { | | |
|     descriptor_tag | 8 | uimsbf |
|     descriptor_length | 16 | uimsbf |
|     UHD_composition_metadata ( ) | | |
| } | | |

| Syntax | No. of bits | Format |
|---|---|---|
| UHD_composition_metadata ( ) { | | |
|     EL2_video_codec_type | 8 | uimsbf |
|     EL2_video_profile | 8 | uimsbf |
|     EL2_video_level | 8 | uimsbf |
|     EL2_video_component_type | 2 | uimsbf |
|     original_UHD_video_type | 4 | uimsbf |
|     original_UHD_video_aspect_ratio | 2 | uimsbf |
|     EL2_video_width_div16 | 16 | uimsbf |
|     EL2_video_height_div16 | 16 | uimsbf |
|     EL2_video_direction | 2 | uimsbf |
|     EL2_video_composition_type | 2 | uimsbf |
|     EL2_dependency_idc | 2 | uimsbf |
|     enhancement_video_filter_num | 8 | bslbf |
|     for (i= 0; i<enhancement_video_filter_num; i++) { | | |
|         enhancement_video_filtering_cordinate_x_div4 | 16 | uimsbf |
|         enhancement_video_filtering_cordinate_y_div4 | 16 | uimsbf |
|         enhancement_video_filtering_width_div4 | 8 | uimsbf |
|         enhancement_video_filtering_height_div4 | 8 | uimsbf |
|         smoothing_filter_coeff ( ) | | |
|     } | | |
| } | | |

FIG. 19

| UHD_video_type | Description |
|---|---|
| 0000 ~ 0010 | reserved |
| 0011 | 3840 x 2160, 60p |
| 0100 | 3840 x 2160, 120p |
| 0101 | 5040 x 2160, 60p |
| 0110 | 5040 x 2160, 120p |
| 0111 | 7680 x 4320, 60p |
| 1000 | 7680 x 4320, 120p |
| 1001 | 10080 x 4320, 60p |
| 1010 | 10080 x 4320, 120p |
| 1011 - 1111 | reserved |

FIG. 20

| original_UHD_video_aspect_ratio | Description |
|---|---|
| 00 | 4 : 3 |
| 01 | 16 : 9 |
| 10 | 21 : 9 |
| 11 | reserved |

FIG. 21

| enhancement_video_direction | Description |
|---|---|
| 00 | left |
| 01 | right |
| 10 | top |
| 11 | bottom |

FIG. 22

| EL2_video_composition_type | Description |
| --- | --- |
| 00 | reserved |
| 01 | top / bottom |
| 10 | side - by - side |
| 11 | separate stream (not single stream) |

FIG. 23

| EL2_dependency_idc | Description |
| --- | --- |
| 00 | reserved |
| 01 | Independent |
| 10 | correlated |
| 11 | reserved |

FIG. 24

| Syntax | No. of bits | Format |
|---|---|---|
| UHD_composition_descriptor ( ) { | | |
|     descriptor_tag | 8 | uimsbf |
|     descriptor_length | 16 | uimsbf |
|     16_9_Extraction_Info_Metadata | | |
| } | | |

| Syntax | No. of bits | Format |
|---|---|---|
| 16_9_Extraction_Info_Metadata ( ) { | | |
|     EL2_video_codec_type | 8 | uimsbf |
|     EL2_video_profile | 8 | uimsbf |
|     EL2_video_level | 8 | uimsbf |
|     original_UHD_video_type | 4 | uimsbf |
|     original_UHD_video_aspect_ratio | 2 | uimsbf |
|     16_9_rectangle_start_x | 16 | uimsbf |
|     16_9_rectangle_start_y | 16 | uimsbf |
|     16_9_rectangle_end_x | 16 | uimsbf |
|     16_9_rectangle_end_y | 16 | uimsbf |
| } | | |

FIG. 25

| Syntax | No. of bits | Format |
|---|---|---|
| UHD_composition_descriptor ( ) { | | |
|     descriptor_tag | 8 | uimsbf |
|     descriptor_length | 16 | uimsbf |
|     UHD_subtitle_position_info | | |
| } | | |

| Syntax | No. of bits | Format |
|---|---|---|
| UHD_subtitle_position_info ( ) { | | |
|     UHD_video_codec_type | 8 | uimsbf |
|     UHD_video_profile | 8 | uimsbf |
|     UHD_video_level | 8 | uimsbf |
|     reserved | 5 | bslbf |
|     UHD_video_component_type | 2 | uimsbf |
|     UHD_video_inclUHDe_subtitle | 1 | bslbf |
|     reserved | 2 | bslbf |
|     riginal_UHD_video_type | 4 | uimsbf |
|     original_UHD_video_aspect_ratio | 2 | uimsbf |
|     AFD_size_2N | 8 | |
| } | | |

FIG. 26

| UHD_video_component_type | Description |
|---|---|
| 00 | reserved |
| 01 | Cropped image |
| 10 | Image processed with scaling and AFD bar insertion |
| 11 | reserved |

FIG. 27

| UHD_video_inclUHDe_subtitle | Description |
|---|---|
| 0 | Include |
| 1 | Not include |

| Syntax | No. of bits | Mnemonic |
|---|---|---|
| service_description_section ( ) { | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     transport_stream_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     original_network_id | 16 | uimsbf |
|     reserved_future_use | 8 | bslbf |
|     for (i=0; i< N; i++) { | | |
|         service_id | 16 | uimsbf |
|         reserved_future_use | 6 | bslbf |
|         EIT_schedule_flag | 1 | bslbf |
|         EIT_present_following_flag | 1 | bslbf |
|         running_status | 3 | uimsbf |
|         free_CA_mode | 1 | bslbf |
|         descriptors_loop_length | 12 | uimsbf |
|         for (j=0; j<N; j++) { | | |
|             descriptor() | | |
|         } | | |
|     } | | |
|     CRC_32 | 32 | rpchof |
| } | | | descriptor() → UHD_program_descriptor() + UHD_component_descriptor (At this point, component_tag field is added)

FIG. 30

| Syntax | No. of bits | Mnemonic |
|---|---|---|
| event_information_section ( ) { | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     service_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     transport_stream_id | 16 | uimsbf |
|     original_network_id | 16 | uimsbf |
|     segment_last_section_number | 8 | uimsbf |
|     last_table_id | 8 | uimsbf |
|     for (i=0; i< N; i++) { | | |
|         event_id | 16 | uimsbf |
|         start_time | 40 | bslbf |
|         duration | 24 | uimsbf |
|         running_status | 3 | uimsbf |
|         free_CA_mode | 1 | bslbf |
|         descriptors_loop_length | 12 | uimsbf |
|         for (i=0; i< N; i++) { | | |
|             descriptor() | | |
|         } | | |
|     } | | |
|     CRC_32 | 32 | rpchof |
| } | | | descriptor() → UHD_program_descriptor() + UHD_component_descriptor
(At this point, component_tag field is added)

FIG. 31

| Syntax | No. of bits | Format |
|---|---|---|
| terrestrial_virtual_channel_table_section ( ) { | | |
|   table_id | 8 | 0xC8 |
|   section_syntax_indicator | 1 | '1' |
|   private_indicator | 1 | '1' |
|   reserved | 2 | '11' |
|   section_length | 12 | uimsbf |
|   transport_stream_id | 16 | uimsbf |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   protocol_version | 8 | uimsbf |
|   num_channel_in_section | 8 | uimsbf |
|   for (i=0; i< num_channel_in_section; i++) { | | |
|     short_name | 7*16 | uimsbf |
|     reserved | 4 | '1111' |
|     major_channel_number | 10 | uimsbf |
|     minor_channel_number | 10 | uimsbf |
|     modulation_mode | 8 | uimsbf |
|     carrier_frequency | 32 | uimsbf |
|     channel_TSID | 16 | uimsbf |
|     program_number | 16 | uimsbf |
|     ETM_location | 2 | uimsbf |
|     access_controlled | 1 | bslbf |
|     hidden | 1 | bslbf |
|     reserved | 2 | '11' |
|     hid_guide | 1 | bslbf |
|     reserved | 3 | '111' |
|     service_type | 6 | uimsbf |
|     source_id | 16 | uimsbf |
|     reserved | 6 | '111111' |
|     descriptors_length | 10 | uimsbf |
|     for (i=0; i<N; i++) { | | |
|       descriptor( ) | | |
|     } | | |
|   } | | |
| } | | | service_type → may be designated as Parameterized service (0x07) or extended parameterized service (0x09) or new DTV service-UHDTV(0x10)

descriptor( ) → UHD_program_descriptor + UHD_component_descriptor

APPARATUS FOR TRANSRECEIVING SIGNALS AND METHOD FOR TRANSRECEIVING SIGNALS

This application is a National Stage Entry of International Application No. PCT/KR2013/010014 filed Nov. 6, 2013, and claims the benefit of U.S. Provisional Application No. 61/723,771 filed Nov. 7, 2012, both of which are hereby incorporated by reference for all purposes as if fully set forth herein in their entireties.

FIELD OF THE INVENTION

The present invention relates to an apparatus for transreceiving signals and a method for transreceiving signals.

BACKGROUND ART

As the video signal processing speed has become faster, a solution for encoding/decoding ultra high definition (UHD) video is being developed. A solution for processing UHD video as well as HD video without any problem, when receiving the UHD video by using a legacy (or conventional) HD receiver, is being developed. For example in case an aspect ratio of a video that is being transmitted is different from an aspect ratio of a display device of a receiver, each receiver shall be capable of processing the corresponding video at an aspect ratio best-fitting the display device.

However, in case of a related art device decoding is not supported for a compressed video having a 21:9 format, which corresponds to the aspect ratio of a UHD video. In case a video of 21:9 is being transmitted, a receiver having the aspect ratio of 21:9 is required to directly process and display the video of 21:9, and a receiver having the aspect ratio of 16:9 is required to first receive a video stream having the aspect ratio of 21:9 and then output the received video stream in a letterbox format, or required to first receive a cropped video having the aspect ratio of 16:9 and then output a video signal. Additionally, in case subtitles are included in the stream, the receiver having the aspect ratio of 16:9 shall be capable of processing subtitle information.

As described above, since the aspect ratio of a legacy HD receiver or a receiver that can process UHD video can be different, in case the corresponding video is transmitted or received and then processes, a problem may occur.

DETAILED DESCRIPTION OF THE INVENTION

Technical Objects

An object of the present invention is to provide a method for transreceiving signals and an apparatus for transreceiving signals that can process different videos having different aspect ratios through a receiver having a display device having a different aspect ratio.

Another object of the present invention is to provide a method for transreceiving signals and an apparatus for transreceiving signals that can receive or transmit backward compatible video, which can be processed by receivers being capable of respectively processing a HD video and a UHD video, each having a different aspect ratio.

Another object of the present invention is to provide a method for transreceiving signals and an apparatus for transreceiving signals that can process signaling information, which can differently process different HD videos and UHD videos each having a different aspect ratio in accordance with the specification of each receiver.

Technical Solutions

According to an exemplary embodiment, provided herein is a method for transmitting signals, which includes encoding video data; generating signaling information which signals displaying the encoded video data to fit an aspect ratio of a receiver, wherein the signaling information includes aspect ratio control information for displaying high-resolution video data of a first aspect ratio regardless of the aspect ratio of the receiver; and multiplexing the encoded video data and the signaling information and transmitting the multiplexed video data and the signaling information.

The aspect ratio control information may include merging information indicating that the encoded video data are divided and transmitted and merging the divided video data.

The aspect ratio control information may include division information dividing the encoded video data to fit the aspect ratio.

The aspect ratio control information may include position information positioning subtitles of the video to be shifted in accordance with a resolution of the video respective to the encoded video data.

According to another exemplary embodiment, provided herein is an apparatus for transmitting signals, which includes an encoder configured to encode video data; a signaling information generating unit configured to generate signaling information which signals displaying the encoded video data to fit an aspect ratio of a receiver, wherein the signaling information includes aspect ratio control information for displaying high-resolution video data of a first aspect ratio regardless of the aspect ratio of the receiver; and a multiplexer configured to multiplex the encoded video data and the signaling information.

According to yet another exemplary embodiment, provided herein is an apparatus for receiving signals, which includes a demultiplexer configured to demultiplex video streams and signaling information; a signaling information decoding unit configured to decode the demultiplexed signaling information, wherein the signaling information includes aspect ratio control information for displaying high-resolution video data of a first aspect ratio regardless of the aspect ratio of the receiver; and a video decoder configured to decode the demultiplexed video streams in accordance with the decoded signaling information.

According to a further exemplary embodiment, provided herein is a method for receiving signals, which includes demultiplexing video streams and signaling information; decoding the demultiplexed signaling information, wherein the signaling information includes aspect ratio control information for displaying high-resolution video data of a first aspect ratio regardless of the aspect ratio of the receiver; and decoding the demultiplexed video streams in accordance with the decoded signaling information.

Effects of the Invention

According to an exemplary embodiment of the present invention, videos having different aspect ratios may be processed through a receiver having a display device having a different aspect ratio.

According to an exemplary embodiment of the present invention, backward compatible video, which can be processed by receivers being capable of respectively processing a HD video and a UHD video, each having a different aspect ratio, may be transmitted or received.

According to an exemplary embodiment of the present invention, HD videos and UHD videos each having a different aspect ratio may be processed differently in accordance with the specification of each receiver.

BRIEF DESCRIPTION OF THE DRAWINGS

FIG. 4 illustrates a general view of another example of transmitting a high resolution image to fit aspect ratios of receivers according to an exemplary embodiment of the present invention.

FIG. 11 illustrates an example of original video, which is separated according to the first exemplary embodiment of the present invention, an exemplary resolution of the separated video and a method for configuring a video.

FIG. 16 illustrates exemplary signaling information that allows video to be displayed according to the exemplary embodiments of the present invention.

FIG. 17 illustrates detailed syntax values of signaling information according to a first exemplary embodiment of the present invention.

FIG. 18 illustrates an example of a stream level descriptor when following the first exemplary embodiment of the present invention.

FIG. 19 illustrates an exemplary value of information indicating resolution and frame rate of the video given as an example shown above.

FIG. 20 illustrates exemplary information respective to an aspect ratio of the original video. This drawing illustrates information respective to the aspect ratio of an original UHD video corresponding to an original_UHD_video_aspect_ratio field, among the above-described signaling information.

FIG. 21 illustrates exemplary direction information of a cropped video.

FIG. 22 illustrates an exemplary method for configuring a video.

FIG. 23 illustrates an exemplary encoding method in case of encoding sub streams.

FIG. 24 illustrates a stream level descriptor in case of following the first exemplary embodiment of the present invention.

FIG. 25 illustrates exemplary signaling information in case of following the third exemplary embodiment of the present invention.

FIG. 26 illustrates an exemplary field value of an exemplary UHD_video_component_type field.

FIG. 27 illustrates an exemplary field value of an exemplary UHD_video_include_subtitle field.

FIG. 28 illustrates exemplary operations of the receiver, in case a format of a transmission video and a display aspect ratio of the receiver are different.

FIG. 29 illustrates an exemplary case when the exemplary descriptors are included in another signaling information.

FIG. 30 illustrates an exemplary case when the exemplary descriptors are included in another signaling information.

FIG. 31 illustrates an exemplary case when the exemplary descriptors are included in another signaling information.

BEST MODE FOR CARRYING OUT THE PRESENT INVENTION

Hereinafter, exemplary embodiments of the present invention that can be easily described will be described in detail with reference to the accompanying drawings.

Figure 1:
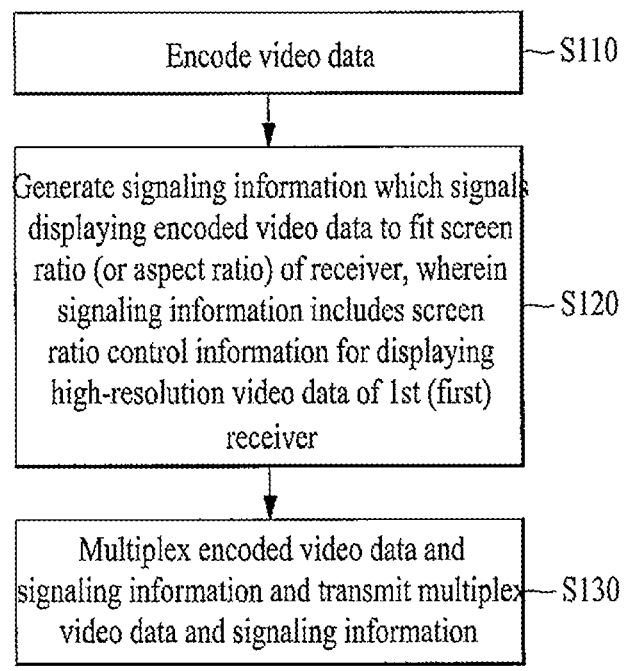
FIG. 1 illustrates a method for transmitting signals according to an exemplary embodiment of the present invention.

FIG. 1 illustrates a method for transmitting signals according to an exemplary embodiment of the present invention.

Video data are encoded (S110). In case of encoding the video data, according to the exemplary embodiment that will hereinafter be disclosed, encoding information of the video data may be included in the encoded video data.

The encoding information that can be included in the encoded video data will be described in detail in FIG. 32. The encoded video data may have different structures depending upon the exemplary embodiments that will hereinafter be disclosed, and such exemplary embodiments may vary in accordance with FIGS. 2 and 3 (First embodiment), FIG. 4 (Second embodiment), FIG. 5 to FIG. 7 (Third embodiment).

For example, the encoded video data consists of a structure having high-resolution video divided to fit the conventional (or already-existing) aspect ratio and may include information, which allows the divided video data to be merged back to the high-resolution video. Alternatively, the encoded video data may include information allowing the high-resolution video data to be divided to fit the aspect ratio of the receiver or may also include position information of a letter for positioning subtitle information (e.g., AFD bar).

In case the transmitted signal corresponds to a broadcast signal, signaling information that signals displaying the video data to fit the aspect ratio of the receiver, which is provided separately from the encoded video data, is generated (S120). An example of the signaling information may include diverse information, which are given as examples in FIG. 16 to FIG. 27 and in FIG. 29 to FIG. 31 according to the respective exemplary embodiment, and, herein, the diverse information, which are given as examples in the drawings mentioned above according to the respective exemplary embodiment, may be generated. The signaling information may include signaling information that signals displaying high-resolution video data having a first aspect ratio on the receiver regardless of the aspect ratio. For example, the signaling information that signals displaying high-resolution video data on the receiver regardless of the aspect ratio may include aspect ratio control information of the high-resolution video data. Examples of the signaling information that is provided separately from the video data are given in FIG. 16 to FIG. 27 and FIG. 29 to FIG. 31.

The encoded video data and the signaling information are multiplexed and the multiplexed video data and signaling information are transmitted (S130).

In case the transmitted data do not correspond to the broadcast signal, generating the signaling information, which is multiplexed with the video data, may be omitted, and video data including aspect ratio control information within the video data section, which is described in step S110, are multiplexed with other data (e.g., audio data) and then outputted.

In case the transmitter transmits the video data in accordance with each exemplary embodiment, even in case there are several types of aspect ratios in the receiver display apparatus, or even in case there are several types of performed, the high-resolution video may be displayed in accordance with the aspect ratio of each corresponding display, or the subtitles may be displayed. Additionally, even in case of the legacy receiver, the high-resolution video data may be displayed in accordance with the aspect ratio of the corresponding receiver. More specifically, the receiver may change the high-resolution video data having the first aspect ratio in accordance with the aspect ratio of the receiver by using screen control information and may then be capable of displaying the changed data.

According to the first exemplary embodiment, the aspect ratio control information may include merging information indicating that the encoded video data are transmitted after being divided and merging the divided video data. According to the second exemplary embodiment, the aspect ratio control information may include division information that can divide the encoded video data to best fir the aspect ratio. And, according to the third exemplary embodiment, the aspect ratio control information may include position information for subtitle positioning, which allows subtitle positions of the video to be changed in accordance with the resolution of the video respective to the encoded video data.

Figure 2:
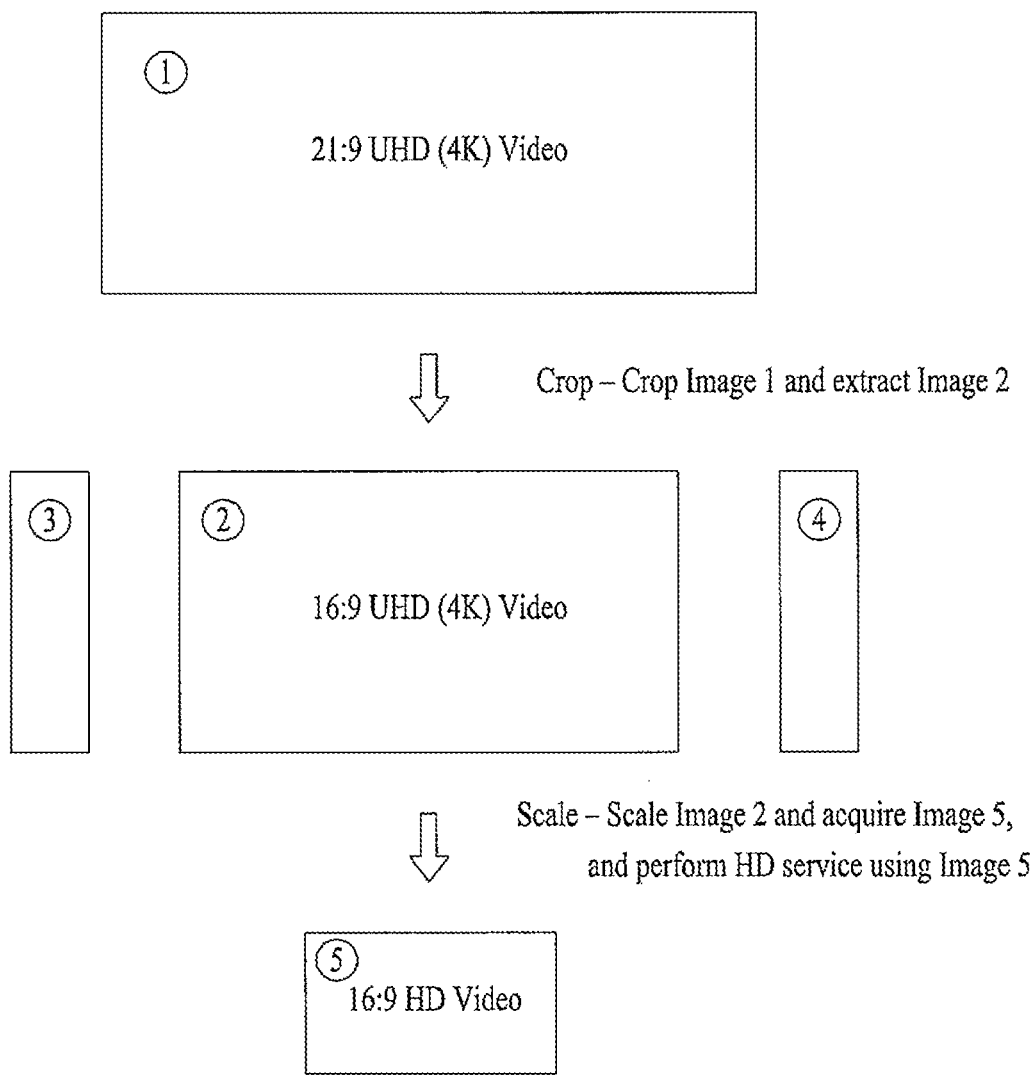
FIG. 2 illustrates a general view of an example of transmitting a high resolution image to fit aspect ratios of receivers according to an exemplary embodiment of the present invention.

FIG. 2 illustrates a general view of an example of transmitting a high resolution image to fit aspect ratios of receivers according to an exemplary embodiment of the present invention. This example shows an exemplary embodiment of servicing an aspect ratio of 16:9 by using a UHD video having an aspect ratio of 21:9.

21:9 UHD source video (Video (1)) is divided to a 16:9 UHD source video (Video (2)) and left/right cropped video (Video (3) and Video (4)). By performing cropping procedures and so on of the video, a video may be divided into 3 videos.

More specifically, Video (1) is divided to Video (2)), Video (3), and Video (4) and then transmitted.

A receiving apparatus that can display UHD video may receive and display Video (2)), Video (3), and Video (4).

Additionally, a receiving apparatus that can display HD video may receive Video (2)) and may convert the UHD video (Video (2))) of 16:9 to a 16:9 HD video (Video (5)) and may then display the converted video.

Figure 3:
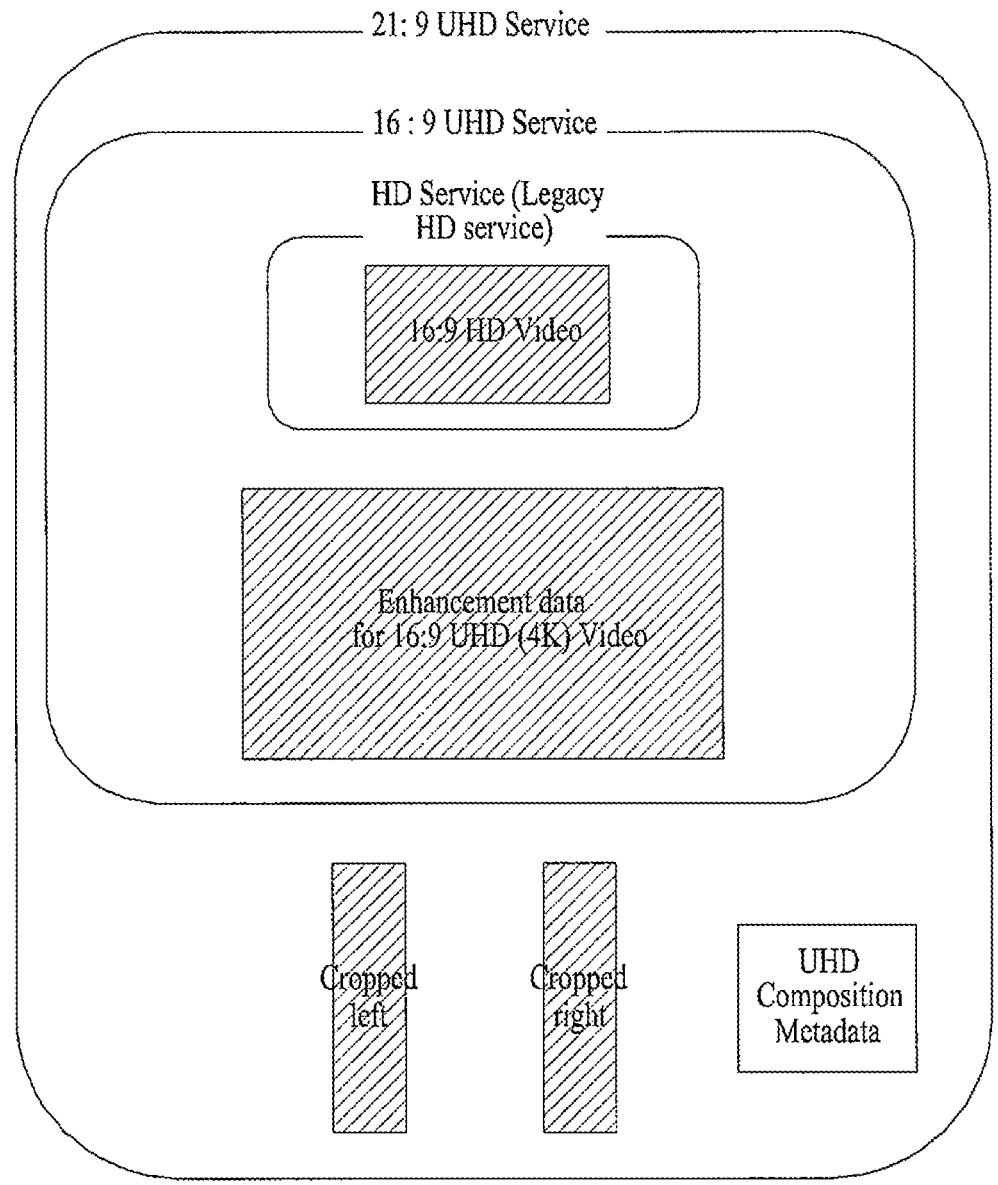
FIG. 3 illustrates a general view of an exemplary stream structure transmitting the high resolution image to fit aspect ratios of receivers according to the exemplary embodiment of the present invention of FIG. 2.

FIG. 3 illustrates a general view of an exemplary stream structure transmitting the high resolution image to fit aspect ratios of receivers according to the exemplary embodiment of the present invention of FIG. 2.

The exemplary stream includes 16:9 UHD video, data being cropped both on the left side and the right side, and supplemental data (UHD composition metadata). The 16:9 UHD video may include HD video having an aspect ratio of 16:9, which can provide the related art HD service, and enhancement data, which correspond to a difference between the 16:9 UHD video and the HD video having the aspect ratio of 16:9.

A legacy HD receiver receives and processes the HD video having the aspect ratio of 16:9, and a 16:9 UHD receiver receives and processes enhancement data for the HD video having the aspect ratio of 16:9 and the UHD video having the aspect ratio of 16:9. Additionally, a 21:9 receiver may configure a 21:9 UHD video by using the UHD video having the aspect ratio of 16:9, the cropped left and right data, and the UHD composition metadata, which correspond to supplemental data. The supplemental data (UHD composition metadata) may include left and right crop (or cropping) coordinates information. Therefore, the receiver may use the supplemental data, so as to generate the UHD video having the aspect ratio of 21:9 by using the UHD video having the aspect ratio of 16:9 and the data being cropped both on the left side and the right side.

Therefore, according to the exemplary embodiment of this drawing, 3 scalable services may be provided.

FIG. 4 illustrates a general view of another example of transmitting a high resolution image to fit aspect ratios of receivers according to an exemplary embodiment of the present invention. In this example, the UHD video having the aspect ratio of 21:9 may be transmitted through a stream that is separate from the HD video having the aspect ratio of 16:9.

Since the HD video of 16:9 is not backward compatible with the UHD video having the aspect ratio of 21:9, the transmitter prepares a UHD video stream, which is separate from the HD video stream. In the UHD video stream, crop coordinates information, which can generate the aspect ratio of a 16:9 video, may be included in supplemental information data (16:9 extraction info metadata) and may then be transmitted.

Therefore, the UHD video receiver receives a UHD video stream having the aspect ratio of 21:9. And, if the UHD video receiver includes a display apparatus having the aspect ratio of 21:9, the UHD video receiver may extract a UHD video from a stream providing the 21:9 UHD service. In this case, the supplemental information data (16:9 extraction info metadata) may be disregarded (or ignored).

Moreover, if the UHD video receiver includes a display apparatus having the aspect ratio of 16:9, the UHD video receiver may extract a video having the aspect ratio of 16:9 from the UHD video stream by using the supplemental information data and may then provide a respective service.

A HD receiver of the related art may provide a HD video by receiving a HD video stream having an aspect ratio of 16:9.

Figure 5:
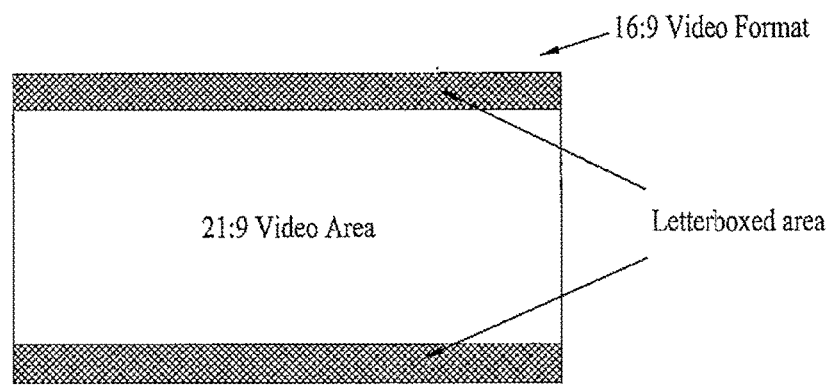
FIG. 5 illustrates a general view of a method for transreceiving signals according to another exemplary embodiment of the present invention.

FIG. 5 illustrates a general view of a method for transreceiving signals according to another exemplary embodiment of the present invention.

For example, a video having an aspect ratio of 21:9 is transmitted, yet the video is transmitted as a video having an aspect ratio of 16:9 after scaling the corresponding video format, and yet the corresponding video may be transmitted after including a letterbox area on an upper portion and lower portion within the video having the aspect ratio of 16:9.

Figure 6:
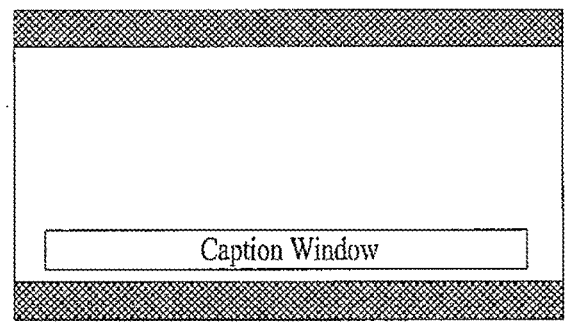
FIG. 6 illustrates an example of an area where subtitles are being outputted, when transmission is performed as shown in FIG. 5.

FIG. 6 illustrates an exemplary output of a subtitle area, when transmission is performed as shown in FIG. 5. A legacy HD video receiver displays a caption window for the subtitle area in a display screen section instead of the letterbox section.

Figure 7:
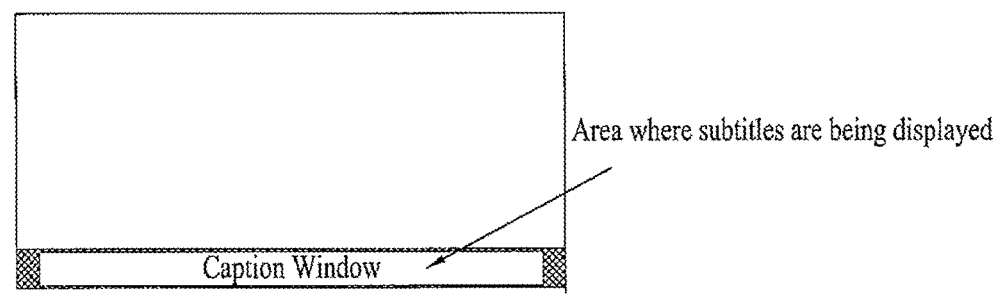
FIG. 7 illustrates an example of displaying a caption window for subtitles in a receiver that can receive UHD video, when transmission is performed as shown in FIG. 5.

FIG. 7 illustrates an example of displaying a caption window for subtitles in a receiver that can receive UHD video, when transmission is performed as shown in FIG. 5. In case subtitles are included in a stream that transmits UHD video, the already-existing video is outputted starting from an upper left portion (0,0), and the subtitles are displayed on the letterbox area (lower area, surplus area of the display screen) corresponding to outer portions of an actual video areas, so that subtitles can be displayed on an empty portion of the display screen, thereby minimizing interference of the subtitles with the video area and allowing the screen to be used efficiently.

Figure 8:
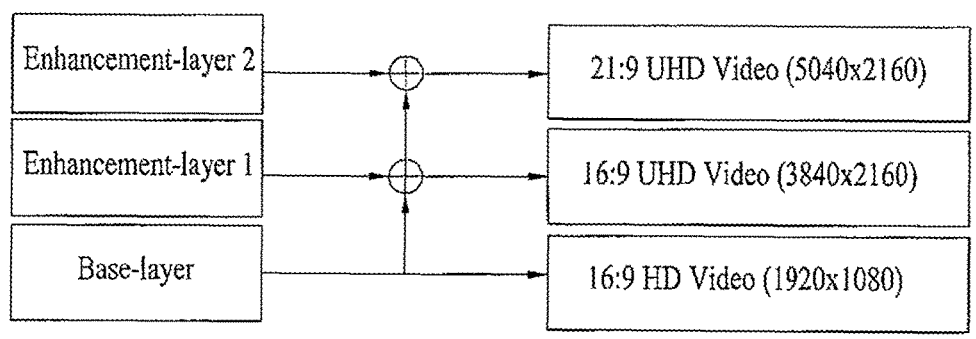
FIG. 8 illustrates an exemplary method for encoding or decoding video data in case of transmitting video data according to a first exemplary embodiment of the present invention.

FIG. 8 illustrates an exemplary method for encoding or decoding video data in case of transmitting video data according to a first exemplary embodiment of the present invention.

The transmitter encodes the 16:9 HD video to base layer data, and the transmitter encodes residual data, which configure the 16:9 UHD based upon the data encoded from the base layer data, to enhancement layer 1 data. Additionally, the transmitter encodes the remaining UHD video, which corresponds to 2.5:9 video corresponding to the remaining cropped data respective to the left side and the right side, to enhancement layer 2 data.

The video data being encoded to enhancement layer 2 may be encoded from the overall UHD video having the aspect ratio 21:9 by using correlation and may be encoded as an independent video. Additionally, as described in the first exemplary embodiment, information related to the left/right positions of the data cropped from the left side and the right side may be transmitted.

The information related to the left/right positions of the video data being encoded to enhancement layer 2 may be transmitted by using exemplary embodiments, such as a header within a video stream corresponding to enhancement layer 2 or a descriptor format of section data of a section level. This will be described later on in more detail.

When the receiver receives only the base layer data and decodes the received data, the receiver may display a 16:9 HD video (1920×1080).

When the receiver decodes the base layer data and the enhancement layer 1 data, the receiver may display a 16:9 UHD video (3840×2160).

And, when the receiver decodes all of the base layer data, the enhancement layer 1 data, and the enhancement layer 2 data, the receiver may display a 21:9 UHD video (5040×2160). In this case, the above-described information related to the left/right positions of the video data, which are encoded to enhancement layer 2, may be used.

Therefore, depending upon the performance or function of the receiver, videos having diverse resolution respective to diverse aspect ratios may be displayed. This example corresponds to an example of transmitting a 4K video by dividing the corresponding 4K video to multiple videos, and videos respective to higher resolution may also be transmitted by using the above-described method.

Figure 9:
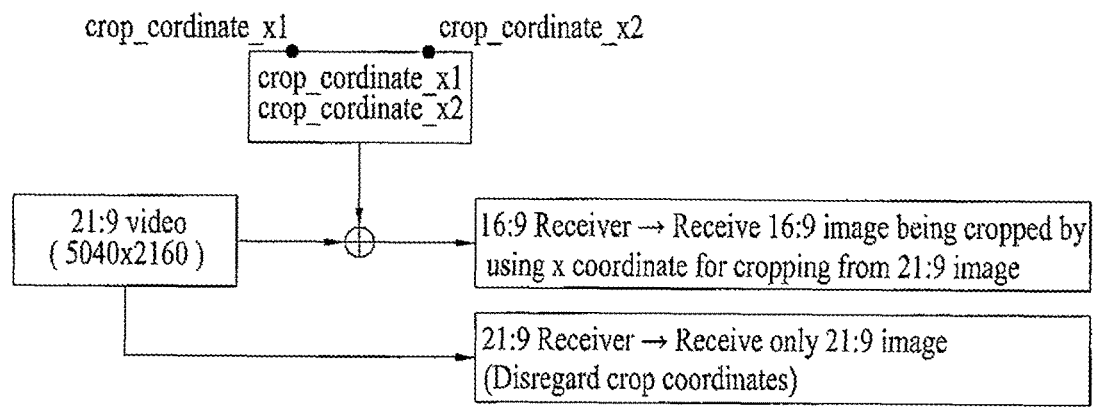
FIG. 9 illustrates an exemplary method for encoding or decoding video data in case of transmitting video data according to a second exemplary embodiment of the present invention.

FIG. 9 illustrates an exemplary method for encoding or decoding video data in case of transmitting video data according to a second exemplary embodiment of the present invention.

If, for example, the transmitter divides (or separates or crops) the 16:9 UHD video from the 4K (5040×2160) UHD video, the transmitter may transmit division (or separation or crop) start information of the 16:9 video along with division (or separation or crop) end information. For example, the transmitter transmits crop_cordinate_x1 information corresponding to starting coordinates within the screen along with crop_cordinate_x2 information of ending coordinates. Herein, the crop_cordinate_x1 information indicates starting coordinates of the 16:9 UHD video and the crop_cordinate_x2 information indicates ending coordinates of the 16:9 UHD video.

The receiver receives the 4K (5040×2160) UHD video, and, then, the receiver may disregard the division start information and the division end information and may directly display the 4K (5040×2160) UHD video.

The receiver receives the 4K (5040×2160) UHD video, and, then, the receiver may cut out (or crop) a 16:9 UHD video from the 21:9 UHD video by using the division start information and the division end information and display the cropped video.

According to the second exemplary embodiment, since the 16:9 HD video is transmitted through a separate stream, the receiver may receive and display the 16:9 HD video stream separately from the 4K (5040×2160) UHD video stream.

Therefore, depending upon the performance or function of the receiver, videos having diverse resolution respective to diverse aspect ratios may be displayed. Similarly, this example corresponds to an example of transmitting a 4K video by dividing the corresponding 4K video to multiple videos, and videos respective to higher resolution may also be encoded or decoded by using the above-described method.

Figure 10:
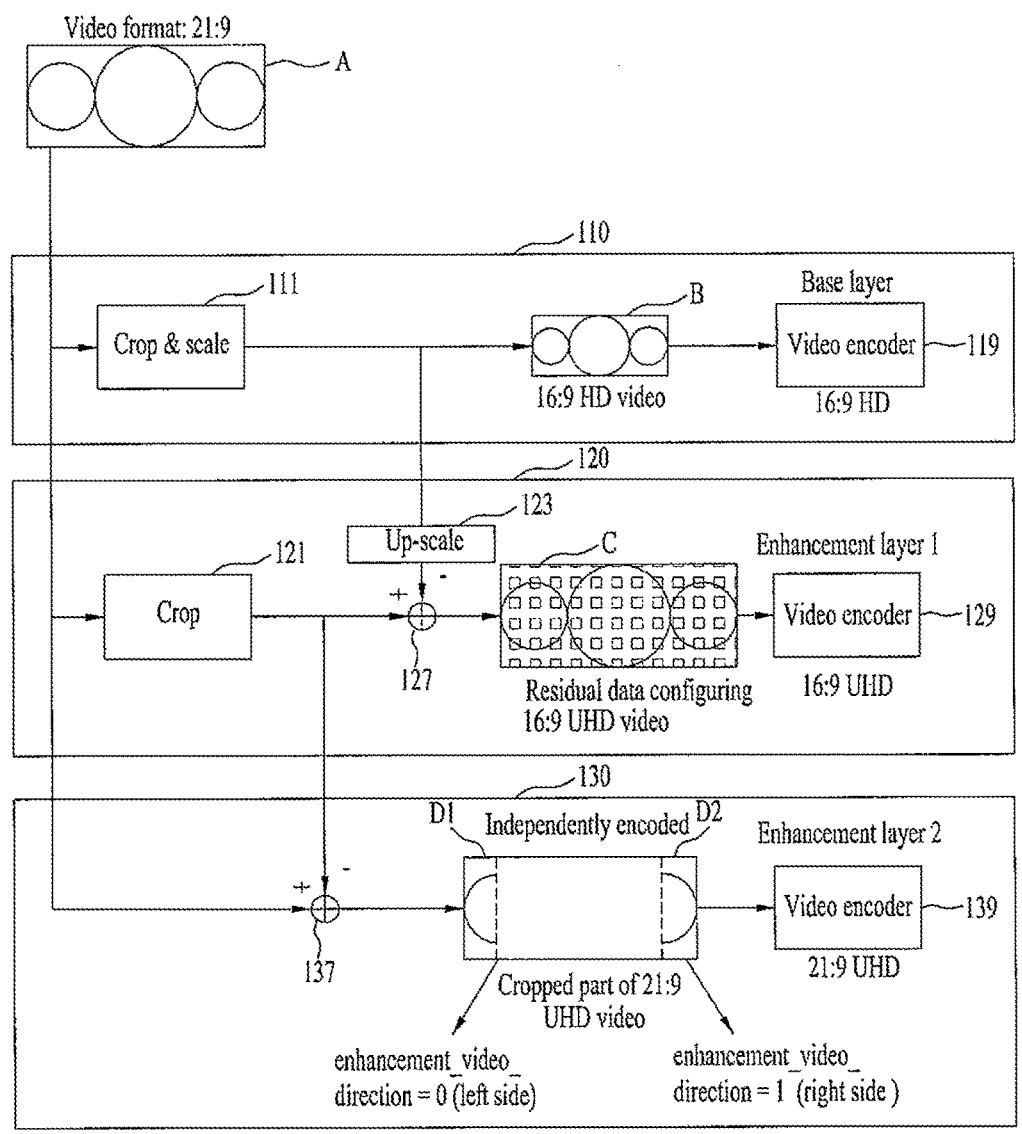
FIG. 10 illustrates an example of an encoder encoding high-resolution video data according to a first exemplary embodiment of the present invention.

FIG. 10 illustrates an example of an encoder encoding high-resolution video data according to a first exemplary embodiment of the present invention. Herein, 21:9 UHD video data of 4K is given as an example of the high-resolution video data. In this drawing, the data related to the video are respectively indicated as A, B, C, D1, and D2.

An exemplary encoder encoding high-resolution video data may include a base layer encoder (110), a first Enhancement layer data encoder (120), and a second Enhancement layer data encoder (130).

For example, as an exemplary encoder, the encoder encoding a UHD video having an aspect ratio of 21:9 may respectively process and encode base layer data, Enhancement layer 1 data, and Enhancement layer 2 data.

A crop and scale unit (111) of the base layer encoder (110) crops the 21:9 UHD video data (A) to 16:9 and reduces its size by performing scaling, thereby outputting the data s 16:9 HD video data (B). A first encoding unit (119) may encode the 16:9 HD video data as the base layer data and may output the coded data.

A crop unit (121) of the first Enhancement layer data encoder (120) crops the 21:9 UHD video data (A) to 16:9. An up-scaler (123) up-scales the down-scaled data, which are outputted from the crop and scale unit (111) of the base layer encoder (110) and outputs the up-scaled data, and a first calculation unit (127) may output residual data (C) of the 16:9 UHD video by using the data cropped by the crop unit (121) and the data up-scaled by the up-scaler (123). A second encoding (129) may encode the 16:9 UHD video as the Enhancement later 1 data and may output the coded data.

A second calculation unit (137) of the second Enhancement layer data encoder (130) may respectively output left side video data (D1) and right side video data (D2), which respectively correspond to cropped data of the 16:9 video data and the cropped data of 21:9 video data by using the 21:9 UHD video data (A) and the data cropped by the crop unit (121).

Each of the left side video data (D1) and the right side video data (D2) may be respectively identified as information on the left side of the corresponding video and information on the right side of the corresponding video. An example of signaling this information will be described later on. Herein, in this example, the identification information (enhancement_video_direction) of the left side video is given as 0, and the identification information (enhancement_video_direction) of the right side video is given as 1.

When the left side video data (D1) and the right side video data (D2) are transmitted as a single stream, the receiver may perform decoding by using the signaling information. In this case, each of the left side video data (D1) and the right side video data (D2) may be respectively coded or the data may be coded as a single set of video data.

Accordingly, in case of transmitting the left side video data (D1) and the right side video data (D2) through two video streams or through a single stream, signaling may be performed so that the data can be divided (or separated) by using each of the identification information.

A third coding unit (130) may encode the cropped left side video data (D1) and right side video data (D2) as the Enhancement layer 2 data.

Accordingly, when each of the base layer data, the Enhancement layer 1 data, the Enhancement layer 2 data are received, UHD video or HD video data may be recovered.

In case the receiver recovers the Enhancement layer 2 data, decoding may be performed by using a decoding method that is related to each of the base layer data and the Enhancement layer 1 data, or the decoding may be performed independently. Such decoding method may be decided in accordance with the coding method.

FIG. 11 illustrates an example of original video, which is separated according to the first exemplary embodiment of the present invention, an exemplary resolution of the separated video.

An example (a) corresponding to the upper left portion represents the resolution of a UHD video having a resolution of 5040×2160 of an aspect ratio of 21:9.

A 4K UHD video having an aspect ratio of 21:9 has a resolution of 5040×2160. Herein, the video corresponding to 16:9 may signify a video having a resolution of 3840×2160, which is referred to as 4K UHD of 16:9 in the conventional broadcasting.

An example (b) corresponding to the upper right portion illustrates an exemplary video having a resolution of 3480×2160 within a UHD video having a resolution of 5040×2160 of an aspect ratio of 21:9.

In an example (c) corresponding to the lower center portion, the video having a resolution of 3840×2160 corresponds to the enhancement layer 1 data, and in case of combining the video having a resolution of 600×2160 of the left side and the right side as a single video, the combined video corresponding to a video having a resolution of 1200×2160 includes the enhancement layer 1 data. At this point, at the video level, signaling is required to be performed on the resolution of surplus data, and signaling on left/right information may also be performed so as to indicate a direction of the video.

In this example, the identification information (enhancement_video_direction) of the left side video is given as 0, and the identification information (enhancement_video_direction) of the right side video is given as 1.

Furthermore, the remaining video that is to be included in the enhancement layer 2 will not be limited only to the edge areas on the left/right sides, and, as a remaining section corresponding to an area excluding an arbitrary 16:9 video from the 21:9 video, the respective position may be arbitrarily designated. For example, an exemplary embodiment, wherein the 16:9 video that is to be extracted from the 21:9 video is set as the left side area, and wherein the enhancement layer 2 is configured of the remaining 5:9 video on the right side area. Additionally, the resolution may also be different from one another. For example, in addition to 4K, the video may also be divided (or separated) as described above within respect to a 8K UHD video and may be transmitted accordingly.

Figure 12:
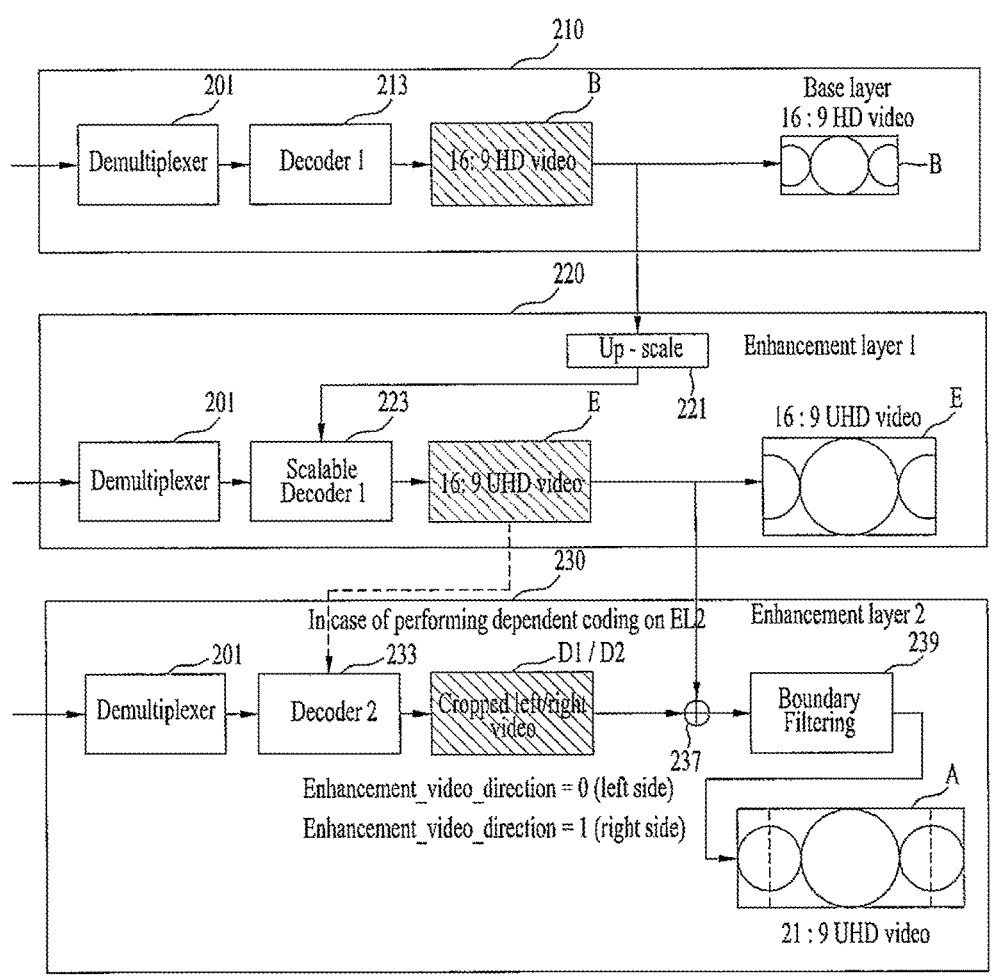
FIG. 12 illustrates an example of a decoder decoding high-resolution video data according to a first exemplary embodiment of the present invention.

FIG. 12 illustrates an example of a decoder decoding high-resolution video data according to a first exemplary embodiment of the present invention. Herein, 21:9 UHD video data of 4K will be given as an example of the high-resolution video data for simplicity in the description. In this drawing, the data related to the video will be respectively indicated as A, B, D1, D2, and E.

An exemplary decoder decoding high-resolution video data may include at least one of a base layer decoder (210), a first Enhancement layer data decoder (220), and a second Enhancement layer data decoder (230). Depending upon the function of the signal receiving apparatus, decoders having 3 functions may all be included, and a decider of the signal receiving apparatus outputting the already-existing HD video may include only the base layer decoder (210). In this example, a demultiplexer (201) may be shared by each of the decoders, or a separate demultiplexer (201) may be included in each of the decoders.

For example, a decoder decoding the UHD video having the aspect ratio of 21:9 may process and decode each of the base layer data, the Enhancement layer 1 data, and the Enhancement layer 2 data.

A first decoder (213) of the base layer decoder (210) may decode the demultiplexed HD video (B) having the aspect ratio of 16:9 and may output the decoded video.

An up-scaler (221) of the first Enhancement layer data decoder (220) up-scales the base layer data, which are decoded by the base layer decoder (210), and outputs the up-scaled data.

A second decoder (223) may perform scalable decoding by using the base layer data and residual data.

The second decoder (223) decodes the demultiplexed residual data of 16:9, and the second decoder (223) may recover the UHD video (E) having the aspect ratio of 16:9 by using the up-scaled base layer data and the decoded residual data of 16:9.

Meanwhile, a third decoder (233) of the second Enhancement layer data decoder (230) decodes the left side/right side video, and the third decoder (233) merges the outputted UHD video (E) of 16:9 and the decoded left side/right side video (D1/D2) by using the Enhancement layer 1 data, which are decoded by the first Enhancement layer data decoder (220), and may then recover the 21:9 UHD video (A).

In this case, the second Enhancement layer data decoder (230) may use identification information for identifying the left side/right side video, and boundary filtering may be performed, so that the 21:9 UHD video (A) can be continuously and naturally displayed at a portion where the left side/right side video are being merged. In this case, the cropped video corresponding to the cropped left side/right side video undergoes a filtering process for being merged with the 16:9 video.

Herein, although the filtering process may be similar to deblocking filtering, which is used in the conventional (or legacy) codec, instead of being applied to all boundaries of the macro block, the filtering process is applied to the surroundings of the cropped video. Just as the conventional deblocking filter, in order to differentiate the boundary, which is generated by merging (or connecting) the actual edge and the cropped portion, filtering may be performed in accordance with a threshold value. This will be described later on.

Figure 13:
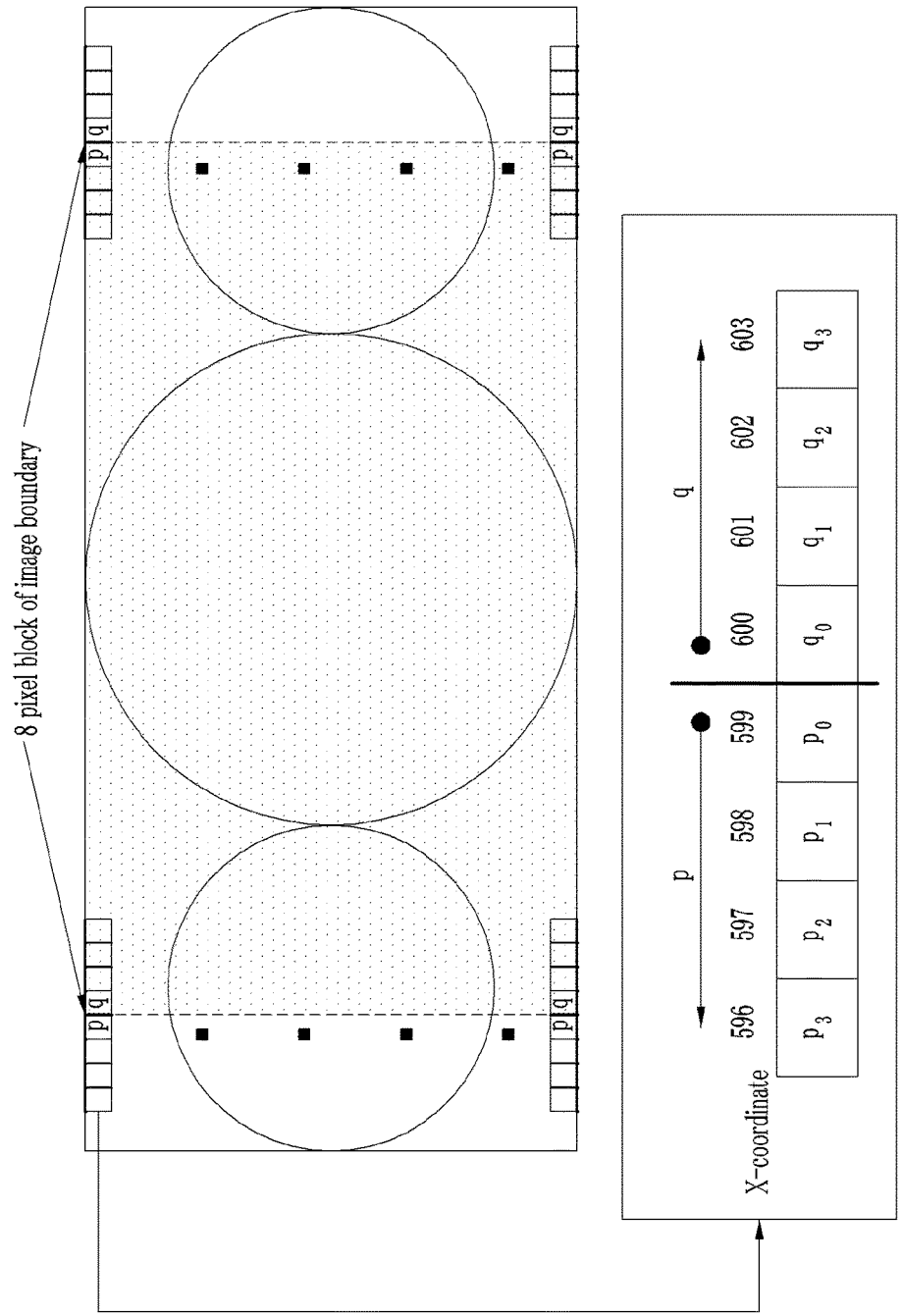
FIG. 13 illustrates an example of merging and filtering cropped videos of the first exemplary embodiment of the present invention.

FIG. 13 illustrates an example of merging and filtering cropped videos of the first exemplary embodiment of the present invention. Herein, an example of removing (or eliminating) a blocking artifact from the boundary of the base layer video, the enhancement layer 1 video, and the enhancement layer 2 video will be described.

In this drawing, for example, among the cropped videos with respect to a merged surface, if a left side video and a right side video are separated (or divided or cropped) and encoded, since a blockage artifact occurs at a stitched portion, blurring is performed at the corresponding boundary area. Filtering may be performed in order to differentiate the boundary, which is generated due to cropping, from the edge of the actual video. A method for performing filtering consists of decoding the left and right side videos each having a size of 600×2160 and then merging the decoded video with the 16:9 UHD video, so as to re-configure a video of 21:9, and then performing filtering by using an arbitrary number of pixels along left-and-right horizontal directions. This drawing corresponds to an example of applying filtering respective to 8 pixels along the left-and-right horizontal directions, wherein coordinates information of the stitched portion can be used.

In this drawing, addresses of pixels included in one field are respectively marked as Pi and qi at the merged portion of the first video and the second video, wherein i is assigned with an integer value starting from 0 in accordance with the x-coordinate. An increasing direction of I may vary at the merged portion of the first video and the second video. It will be assumed that an address of pixels along the x-axis of the merged portion corresponds to 596, 597, 598, 599 (pixels with the first video), 600, 601, 602, and 603 (pixel with the second video).

In order to acquire a condition for satisfying Condition 1, which is shown in Equation 1, values P0, P1, P2 . . . satisfying Equation 2 to Equation 4 are updated to values P0', P1', P2' by using a 4-tap filter and a 5-tap filter.

Equation 1 represents Condition 1.

$(Abs(p_2-p_0)<\beta)(Abs(p_0-q_0)<((\alpha K2)+2))$     Equation 1

$p'_0=(p_2+2*p_1+2*p_0+2*q_0+q_1+4)K3$     Equation 2

$p'_1=(p_2+p_1+p_0+q_0+2)K2$     Equation 3

$p'_2=(2*p_3+3*p_2+p_1+p_0+q_0+4)K3$     Equation 4

Herein, each of the actual edge and blocking artifact may be differentiated from one another by using Condition 1, which is related to Equation 2 to Equation 4, and Condition 2, which is related to Equation 6.

In case Condition 1 of Equation 1 is not satisfied, as described above, the values of P0 and q0 are updated to values of P0' and q0' by using a 3-tap filter, as shown in Equation 5.

$p'_0=(2*p_1+p_0+q_1+2)K2$     Equation 5

Condition 2 of Equation 6 corresponds to a condition for filtering a q block, and, in case this condition is satisfied, as shown in Equation 7 to Equation 9, q0, q1, and q2 are updated to values of q0', q1', and q2' by using a 4-tap filter and a 5-tap filter.

Equation 6 represents Condition 2.

$(Abs(q_2-q_0)<\beta)(Abs(p_0-q_0)<((\alpha K2)+2))$     Equation 6

$q'_0=(q_2+2*q_1+2*q_0+2*q_0+p_1+4)K3$     Equation 7

$q'_1=(q_2+q_1+q_0+p_0+2)K2$     Equation 8

$q'_2=(2*q_3+3*q_2+q_1+q_0+p_0+4)K3$     Equation 9

In case Condition 2 is not satisfied, the value of q0 is updated to a value of q0' by using Equation 10.

$q'_0=(2*q_1+q_0+p_1+2)K2$     Equation 10

α (offset_alpha_value) and β (offset_beta_value) of Conditions 1 and 2 may adjust intensity of the filter by using an offset respective to a QP (quantization parameter). By adjusting the filter intensity by using the offset respective to a QP (quantization parameter), and, accordingly, by adequately allocating an offset of a smoothing filter accordingly, details of the video may be adjusted.

Figure 14:
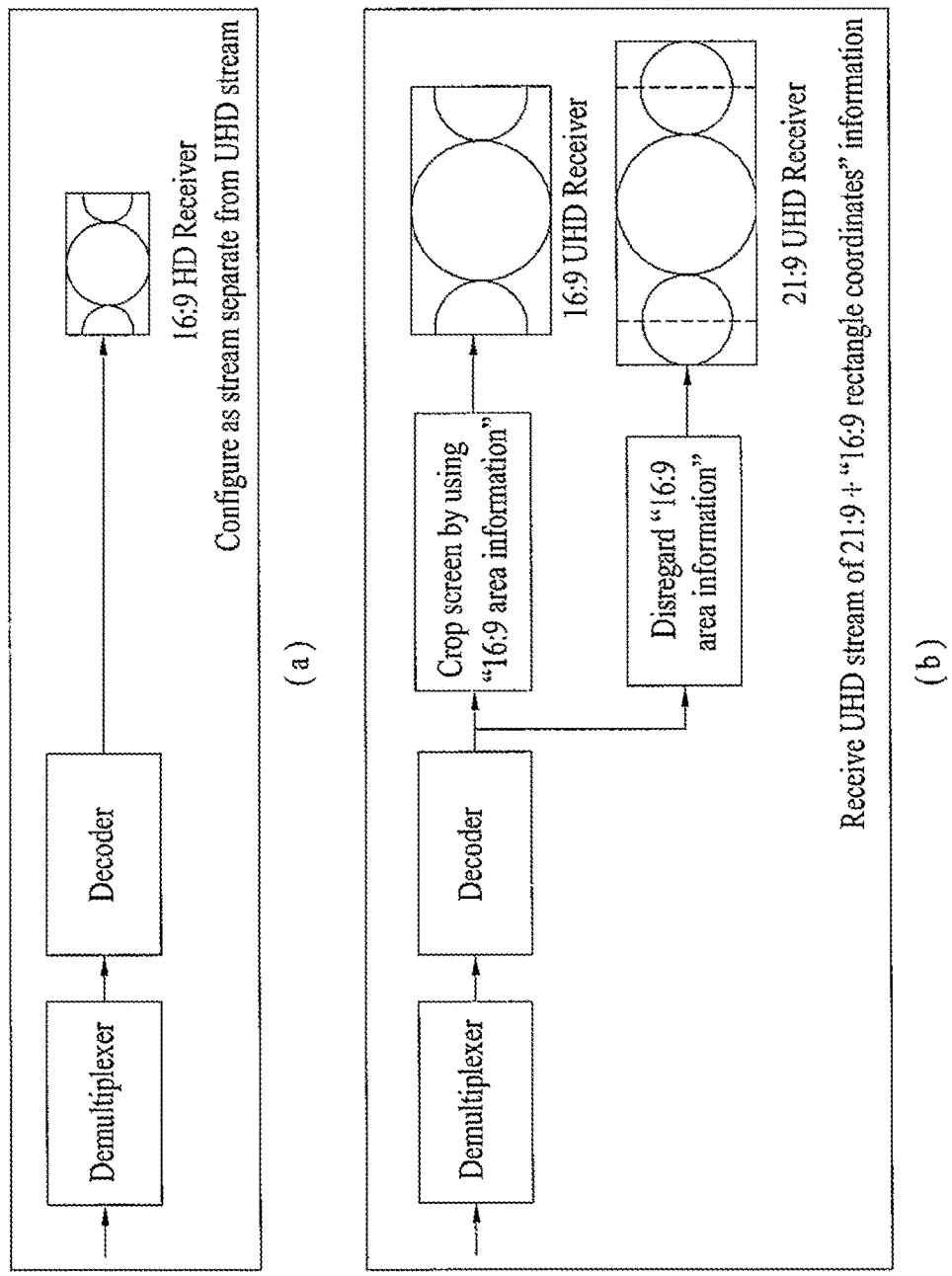
FIG. 14 illustrates a first example of a receiver according to a second exemplary embodiment of the present invention.

FIG. 14 illustrates a first example of a receiver according to a second exemplary embodiment of the present invention.

According to the second exemplary embodiment of the present invention, a stream of a HD video and a stream of a UHD video may be transmitted through separate streams.

Therefore, a receiver(a) that can display HD video may include a demultiplexer and a decoder, wherein the demultiplexer demultiplexes the HD video stream, and wherein the decoder decodes the corresponding video data, so that a 16:9 HD video can be displayed.

Meanwhile, a receiver(b) that can display UHD video may also include a demultiplexer and a decoder. In this case, the demultiplexer demultiplexes the UHD video stream, and the decoder decodes the corresponding video data, so that a UHD video can be displayed.

At this point, depending upon the performance of the receiver, the UHD video may correspond to a 16:9 UHD video corresponding to a cropped video of a portion of the video or may correspond to a 21:9 UHD video that has not been cropped. As described above in the second exemplary embodiment, depending upon its performance, the receiver may display a decoded UHD video, and, in case of the UHD video having an aspect ratio of 16:9, after cropping the video by using cropping position information (indicated as 16:9 rectangle coordinates) of the original 21:9 UHD video, the cropped video may be displayed. Herein, although description is made by giving the 4K UHD video as an example, the above-described method may be identically applied even if the resolution of the video becomes higher.

Figure 15:
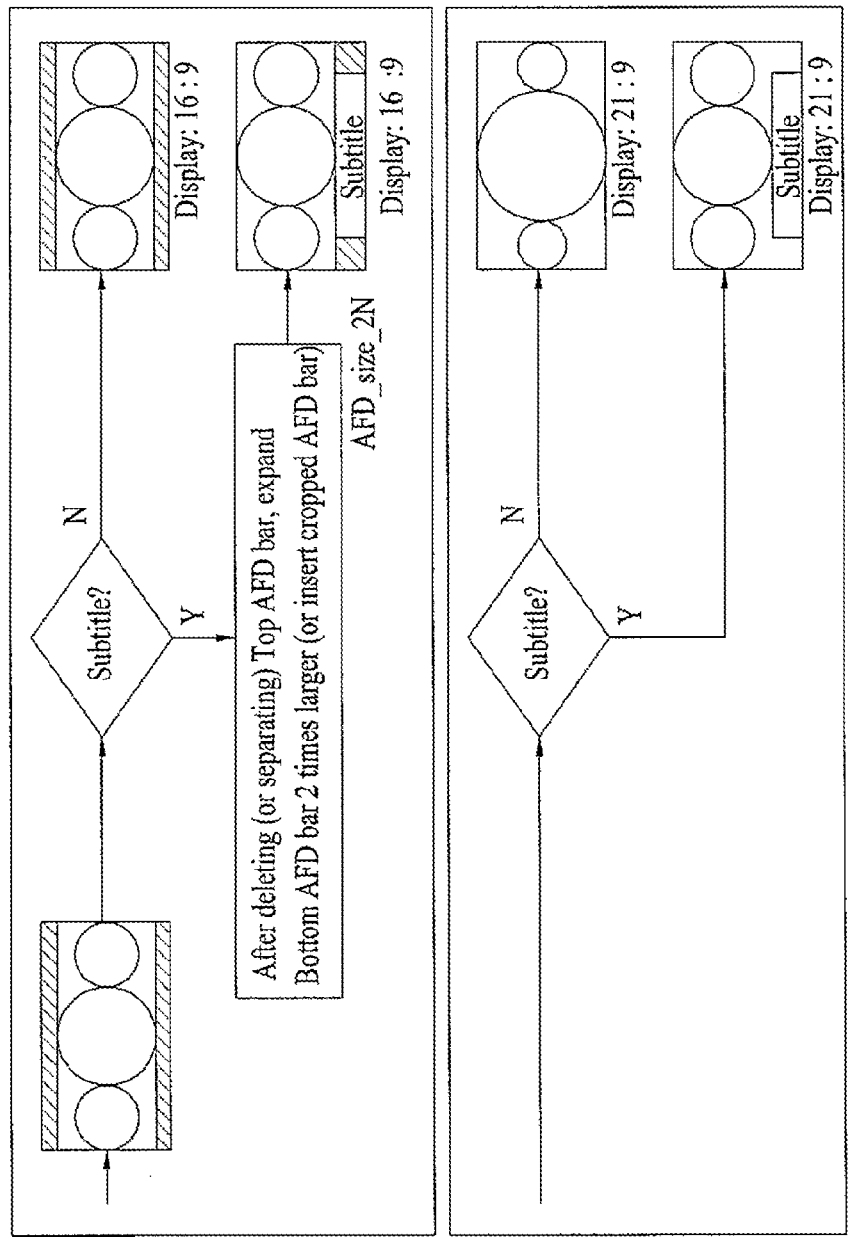
FIG. 15 illustrates exemplary operations of a receiver according to a third exemplary embodiment of the present invention.

FIG. 15 illustrates exemplary operations of a receiver according to a third exemplary embodiment of the present invention. According to the third exemplary embodiment of the present invention, a UHD video having the aspect ratio of 21:9 is transmitted in a format having a scaled video having an aspect ratio of 16:9 and having a letterbox positioned on upper and lower portions of the video inserted therein. In case of a video having subtitle information displayed, depending upon the performance of the receiver, the subtitle information may be displayed on the 16:9 video or may be displayed on the letterbox.

In this drawing, video (A) shows an example of a 16:9 video being transmitted according to the above-described third exemplary embodiment and a letterbox being displayed on the corresponding video. Depending upon the performance of the receiver, the method for processing this video may vary.

First of all, in case subtitle information (subtitle) for the video does not exist in the receiver including a display having an aspect ratio of 16:9, the receiver may directly display the 16:9 video and the letterbox. Conversely, in case subtitle information for the transmitted video is included, this receiver may delete or separate (or divide) the top letterbox (Top AFD bar) and may expand the bottom letterbox (bottom AFD (Active Format Description) bar) to twice its initial size or may paste (or attach) the top letterbox to the bottom letterbox, so that the video format can be converted to a letterbox (AFD_size_2N) having a size that is two times its initial size and then displayed.

More specifically, when a UHD video of 5040×2160 is given as an example, the receiver inserts a letterbox (AFD bar) each having the size of 3840×N×2 (herein, N represents a height of the letterbox) with respect to the received video on a lower portion of the video, and, by displaying subtitles on the corresponding position, the screen may be efficiently positioned. Herein, 2×N may be equal to 135. More specifically, in case of changing the UHD video format of 5040×2160, which is given as an example, to a (UHD or HD) video format of 16:9, the height of the letterbox (AFD_size_2N), which is being inserted for displaying subtitle information on a bottom (or lower) portion of the video, becomes equal to 515(5040:3840=2160:(2160−X)->X=515=AFD_size_2N). In case the subtitle information for the video does not exist, just as the conventional method, an AFD bar of 3840×N may be inserted in each of the bottom portion and top portion of the video. This may be applied by using the same method even when the resolution of the video becomes higher.

Conversely, in case of transmitting a 21:9 video, and in case subtitles exist, a receiver including a display having an aspect ratio of 21:9 may display subtitles on the corresponding video, and, in case subtitles do not exist, the receiver may directly receive and display the corresponding video.

Hereinafter, in case a video is being transreceived according to the exemplary embodiments of the present invention, an example of signaling information of a broadcast signal that can process the video will be given.

FIG. 16 illustrates exemplary signaling information that allows video to be displayed according to the first exemplary embodiment of the present invention. This drawing illustrates an exemplary PMT as the signaling information at a system level, and, herein, the signaling information may include a program level descriptor immediately following a program_info_length of the PMT and a stream level descriptor immediately following an ES_info_length field.

This drawing shows an example of a UHD_program_type_descriptor as an example of the program level descriptor.

descriptor_tag indicates an identifier of this descriptor.

And, as described above, UHD_program_format_type may include information identifying each exemplary embodiment, as described above.

For example, in case the UHD_program_format_type is equal to 0x01, this indicates the first exemplary embodiment of the present invention, which indicates that the transmitted UHD video of 21:9 corresponds to a video format, which can be displayed by using an area corresponding to a difference between a 16:9 HD video, 16:9 UHD video, and 21:9 UHD video and a 16:9 UHD video as separate layer data, or that the transmitted UHD video of 21:9 corresponds to a service type corresponding to the respective video format.

In case the UHD_program_format_type is equal to 0x02, this indicates the second exemplary embodiment of the present invention, which indicates that the transmitted UHD video of 21:9 corresponds to a video format that can be transmitted by using crop information for a 21:9 video or 16:9 video or to a service type respective to the corresponding video format.

In case the UHD_program_format_type is equal to 0x03, this indicates the third exemplary embodiment of the present invention, which indicates that the transmitted UHD video of 21:9 corresponds to a video format that can be transmitted by using letterbox (AFDbar) information for the 21:9 video and 16:9 video or to a service type respective to the corresponding video format.

Additionally, as an example of a stream level descriptor, a UHD composition descriptor is given as an example. This descriptor may include information on a stream, which configures a service or program according to the first, second, and third exemplary embodiments of the present invention.

For example, in case of following the first exemplary embodiment, information identifying a stream transmitting each of the base layer data, enhancement layer 1 data, and enhancement layer 2 data may be included. This will be described later on in more detail.

FIG. 17 illustrates detailed syntax values of signaling information according to a first exemplary embodiment of the present invention.

The information according to the exemplary embodiments of the present invention is signaled as signaling information of a broadcast signal, and, in case the signaling information corresponds to the PMT, the exemplary field values given herein may indicate the following information.

The first exemplary embodiment transmits streams respectively transmitting each of the base layer data, enhancement layer 1 data, and enhancement layer 2 data, and this exemplary embodiment may signal all of the above-mentioned data.

First of all, in the first exemplary embodiment, a program_number field may correspond to program number information respective to a 21:9 UHD program.

Additionally, the following information may be included in the PMT with respect to a stream transmitting the base layer data. Stream_type may be equal to values, such as 0x02, which indicates a video stream respective to a MPEG-2 video codec. Elementary_PID indicates a PID value of an elementary stream, which is included in each program, and, herein, this example indicates an exemplary value of 0x109A. The stream level descriptor may include signaling information related to the MPEG-2 video.

The following information may be included in the PMT with respect to a stream transmitting the first enhancement layer data. Stream_type indicates a video stream respective to a HEVC scalable layer video codec, and, herein, an exemplary value of 0xA1 is given as an example. Elementary_PID indicates a PID value of an elementary stream, which is included in each program, and, herein, this example indicates an exemplary value of 0x109B. A UHDTV_sub_stream_descriptor( ) which corresponds to the stream level descriptor, may include signaling information related to the first enhancement layer, which is required for configuring a 16:9 video by using the base layer.

The following information may be included in the PMT with respect to a stream transmitting the second enhancement layer data. Stream_type indicates a video stream respective to a HEVC scalable layer video codec, and, herein, an exemplary value of 0xA2 is given as an example. Elementary_PID indicates a PID value of an elementary stream, which is included in each program, and, herein, this example indicates an exemplary value of 0x109C. A UHDTV_composition_descriptor( ) which corresponds to the stream level descriptor, may include signaling information related to the second enhancement layer and that is related to the recovery of the 21:9 UHD video.

FIG. 18 illustrates an example of a stream level descriptor when following the first exemplary embodiment of the present invention.

According to the example of FIG. 16, UHD_program_format_type, which is included in the program level descriptor, may have a value of 0x01 with respect to the first exemplary embodiment.

The stream level descriptor may include a descriptor_tag value, which can identify this descriptor, descriptor_length indicating the length of this descriptor, and UHD_composition_metadata( ).

In this example, exemplary information being included in the UHD_composition_metadata( ) is given as described below.

An EL2_video_codec_type field indicates codec information of a video element being included in a UHD service. For example, this value may have a value that is identical to the stream_type of the PMT.

An EL2_video_profile field may indicate profile information on the corresponding video stream, i.e., information on the basic specification that is required for decoding the corresponding stream. Herein, requirement information respective to color depth (4:2:0, 4:2:2, and so on), bit depth (8-bit, 10-bit), coding tool, and so on, of the corresponding video stream may be included.

An EL2_video_level field corresponds to level information respective to the corresponding video stream, and, herein, information on a technical element support range, which is defined in the profile, may be included.

In case the corresponding video stream configures a UHD service, an EL2_video_component_type field indicates types of data that are being included. For example, a stream indicates identification information respective to whether the included data correspond to base layer data respective to 16:9 HD, first enhancement layer data of 16:9, second enhancement layer for 21:9 UHD.

An original_UHD_video_type field corresponds to a field for signaling information respective to a UHD video format, and this field may indicate basic information, such as resolution and frame rate, and so on.

An original_UHD_video_aspect_ratio field indicates information related to the aspect ratio of the original UHD video.

An EL2_video_width_div16 field and an EL2_enhancement_video_height_div16 field indicate resolution information of a sub video corresponding to the second enhancement layer data. For example, horizontal and vertical sizes of the video, which is being displayed as the second enhancement layer data, may be expressed in units of a multiple of 16.

An EL2_video_direction field may indicate direction information of a cropped video.

An EL2_video_composition_type field indicates a method of configuring sub_videos, when sub_videos of the UHD video are combined to configure a single video, thereby being transmitted as a single stream.

When compressing left and right sub-videos of the UHD video, an EL2_dependency_idc field indicates information on whether encoding has been performed independently or whether a coding method related to the 16:9 UHD video has been used.

In case of decoding video cropped on the left side and the right side, since a blocked area (artifact) exists in the video, filtering may be applied, and, herein, an enhancement_video_filter_num field indicates whether or not filtering has been applied and also indicates a number of fields.

An enhancement_video_filtering_cordinate_x_div4 field and an enhancement_video_filtering_cordinate_y_div4 field respectively indicate coordinates of a first pixel along an X-direction and a Y-direction of a portion of the video to which filtering is to be applied. The actual coordinates may correspond to values equal to the respective field multiplied by 4. For example, in this case, the coordinates may be based upon the UHD video, i.e., the coordinates may be based upon a UHD video, which is recovered by using the base layer, first enhancement layer, and second enhancement layer.

An enhancement_video_filtering_width_div4 field and an enhancement_video_filtering_width_div4 field may respectively indicate a size of the video area to which filtering is to be applied in a number of pixels. For example, the size of the area to which filtering is to be applied may correspond to a value that is equal to the actual size being multiplied by 4.

FIG. 19 illustrates an exemplary value of information indicating resolution and frame rate of the video given as an example shown above. Among the signaling information, the original_UHD_video_type field may indicate a resolution and a frame rate of the video, and this drawing shows an example indicating that diverse resolutions and frame rates may be given with respect to the value of this field. For example, in case the original_UHD_video_type field is given a value of 0101, the original video may have 60 frames per second and a resolution of 5040×2160.

FIG. 20 illustrates exemplary information respective to an aspect ratio of the original video. Among the above-described signaling information, the original_UHD_video_aspect_ratio field indicates information related to the aspect ratio of the original UHD video. For example, in case the value of this field is equal to 10, this drawing provides an example that this field indicates an aspect ratio of 21:9.

FIG. 21 illustrates exemplary direction information of a cropped video. Among the above-described signaling information, the EL2_video_direction field shows an example of direction information of the cropped video (second enhancement layer data). For example, in the first exemplary embodiment of the present invention, the cropped left and right video may have direction information, and, in this example, if the value of the information on this direction is equal to 00, this indicates a leftward direction, if the value is equal to 01, this indicates a rightward direction, if the value is equal to 10, this indicates an upward direction, and, if the value is equal to 11, this indicates a downward direction.

FIG. 22 illustrates an exemplary method for configuring a video. In case the base layer data, the first enhancement layer data, and the second enhancement layer data are combined, the above-described EL2_video_composition_type field provides exemplary signaling information allowing such data to be combined.

For example, in the first exemplary embodiment, when the value of this field is equal to 01, this example indicates that top/bottom second enhancement layer data are combined, and, when the value of this field is equal to 10, this example indicates that the second enhancement layer data are combined side-by-side, and when the value of this field is equal to 11, this example indicates that the sub stream is transmitted to a separate stream other than the sub stream along with the base layer data and the first enhancement layer data.

FIG. 23 illustrates an exemplary encoding method in case of encoding sub streams. The EL2_dependency_idc field, which is described above when following the first exemplary embodiment, may indicate whether the base layer data, the first enhancement layer data, and the second enhancement layer data are encoded by being related to one another or whether they are independently encoded. For example, it may be said that, when encoding specific data, data being used for time estimation or point estimation are encoded in relation with the specific data.

For example, when the value of this field is equal to 01, this may indicate that the second enhancement layer data are independently encoded without any relation with other data, and, when the value of this field is equal to 10, this may indicate that the second enhancement layer data are encoded in relation with other data.

Hereinafter, when following the second exemplary embodiment of the present invention, the following corresponds to a drawing showing an example of signaling information allowing a video to be displayed.

FIG. 24 illustrates a stream level descriptor, which can be included in the PMT of FIG. 16.

When following the second exemplary embodiment of the present invention, a HD video stream and a UHD video stream may be transmitted through separate streams. And, the UHD video stream may include metadata that can be converted to another aspect ratio based upon the aspect ratio of the receiver.

Similarly, descriptor_tag and descriptor_length respectively indicate an identifier and a length of this descriptor.

Herein, in case of the second exemplary embodiment, 16_9_extension_info_metadata( ) includes signaling information respective to a stream configuring the UHD video.

For example, an EL2_video_codec_type field indicates codec information of a video element being included in a UHD service. For example, this value may have a value that is identical to the stream_type of the PMT.

An EL2_video_profile field may indicate profile information on the corresponding video stream, i.e., information on the basic specification that is required for decoding the corresponding stream. Herein, requirement information respective to color depth (4:2:0, 4:2:2, and so on), bit depth (8-bit, 10-bit), coding tool, and so on, of the corresponding video stream may be included.

An EL2_video_level field corresponds to level information respective to the corresponding video stream, and, herein, information on a technical element support range, which is defined in the profile, may be included.

An original_UHD_video_type field corresponds to a field for signaling information respective to a UHD video format, and this field may indicate information related to the video, such as resolution and frame rate, and so on.

An original_UHD_video_aspect_ratio field indicates information related to the aspect ratio of the original UHD video.

In case the resolution of the UHD video corresponds to a 21:9 format, such as 5040×2160, a 16_9_rectangle_start_x, field, a 16_9_rectangle_start_y field, a 16_9_rectangle_end_x field, and a 16_9_rectangle_end_y field respectively indicate position information that can designate a valid 16:9 screen area from the 21:9 video. Pixel positions of an upper left portion of the corresponding area may be designated by 16_9_rectangle_start_x and 16_9_rectangle_start_y, and pixel positions of a lower right portion of the corresponding area may be designated by the 16_9_rectangle_end_x and 16_9_rectangle_end_y. By using these fields, the receiver having a 16:9 display format may output only the area that is designated by this field, and the remaining area may be cropped but not displayed.

FIG. 25 illustrates exemplary signaling information in case of following the third exemplary embodiment of the present invention.

In case of following the third exemplary embodiment of the present invention, the video having the aspect ratio of 21:9 is transmitted as a video having an aspect ratio of 16:9. At this point, depending upon the screen of the receiver, the receiver including a display of 16:9 displays subtitles on the video as in the related art, and the receiver including a display of 21:9 displays subtitles in an empty portion of the screen.

In this case, a stream level descriptor of the PMT may include the exemplary information presented in this drawing.

Similarly, descriptor_tag and descriptor_length respectively indicate an identifier and a length of this descriptor. UHD_subtitle_position_info( ) may include information on where the subtitles are being positioned.

A UHD_video_codec_type field indicates codec information of a video element being included in a UHD service. For example, this value may have a value that is identical to the stream_type of the PMT.

A UHD_video_profile field may indicate profile information on the corresponding video stream, i.e., information on the basic specification that is required for decoding the corresponding stream. Herein, requirement information respective to color depth (4:2:0, 4:2:2, and so on), bit depth (8-bit, 10-bit), coding tool, and so on, of the corresponding video stream may be included.

A UHD_video_level field corresponds to level information respective to the corresponding video stream, and, herein, information on a technical element support range, which is defined in the profile, may be included.

When converting a 21:9 video to a video format best-fitting a 16:9 display, there are a case when the video is simply cropped and a case when the video is scaled and then inserted in a letterbox area (AFD bar).

A UHD_video_component_type field indicates information on whether the converted 16:9 video corresponds to a scaled video or a cropped video.

A UHD_video_include_subtitle field indicates whether or not the stream corresponds to a stream that is provided with subtitle information within the video respective to the corresponding stream.

An original_UHD_video_type field corresponds to a field for signaling information respective to a UHD video format, and this field may indicate information related to the video, such as resolution and frame rate, and so on.

An original_UHD_video_aspect_ratio field indicates information related to the aspect ratio of the UHD video.

An AFD_size_2N field may indicate that, in case subtitles are not included in the video respective to the stream in the UHD_video_include_subtitle, an AFD bar of (horizontal resolution×AFD_size_2N/2) are respectively added to an upper portion and a lower portion, and, the field may also indicate that, in case of a stream respective to a video having subtitles included therein, an AFD bar having a size of (horizontal resolution×AFD_size_2N) may be added to a lower portion. During a process of outputting a remaining 21:9 video area excluding the top and bottom letterbox area by using this field, the receiver may perform a function of adjusting subtitle position by having the subtitles displayed on a remaining area after shifting the position of the video upward.

FIG. 26 illustrates an exemplary field value of an exemplary UHD_video_component_type field. For example, when using this field, identification may be performed as to whether the received 16:9 video corresponds to cropped video or video inserted in the letterbox (AFD bar) after being scaled.

FIG. 27 illustrates an exemplary field value of an exemplary UHD_video_include_subtitle field. For example, depending upon whether this value is equal to 0 or 1, this field may indicate whether subtitle information is included or whether subtitle information is not included in the stream or the video respective to the stream.

Figure 28:
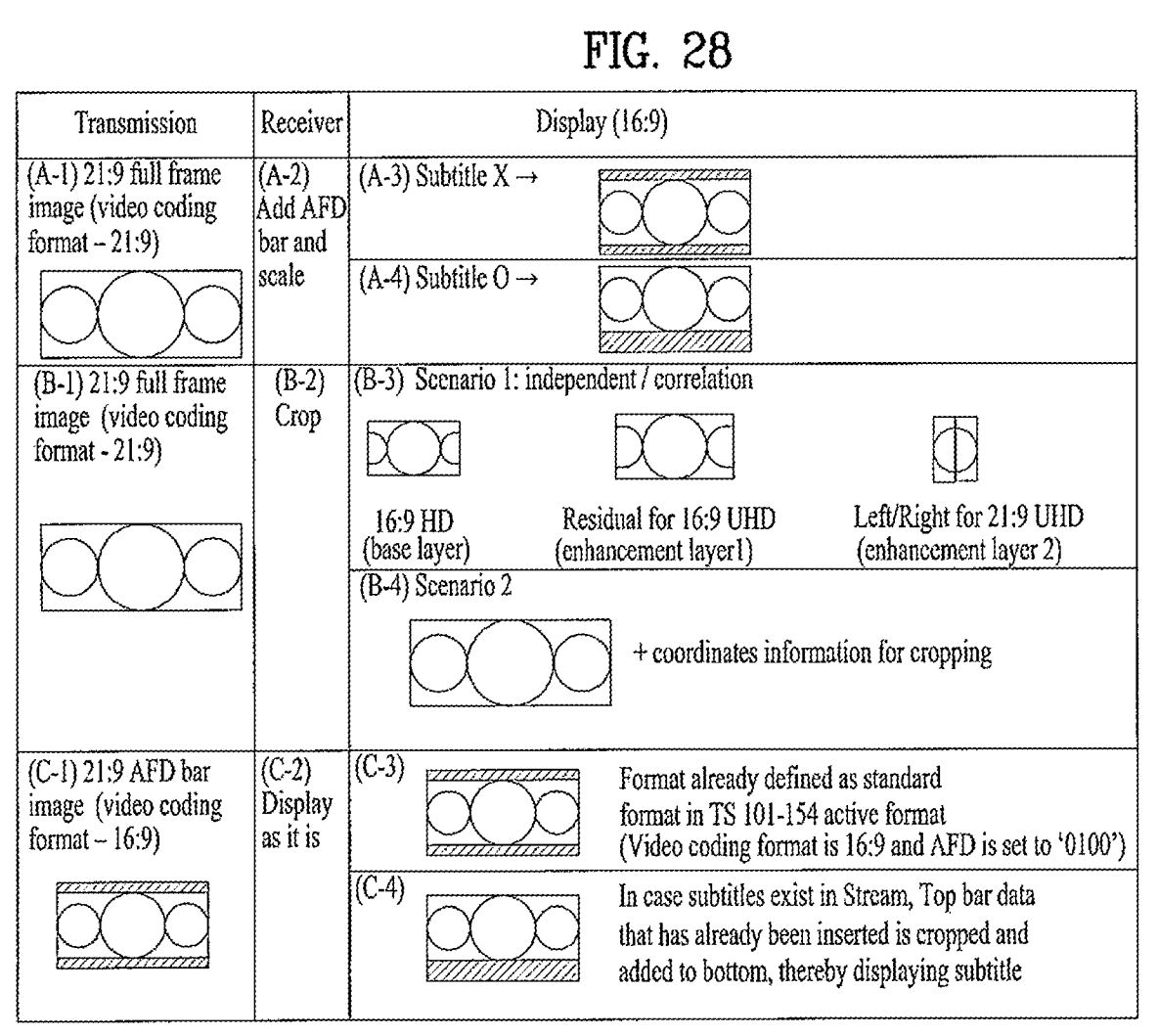

FIG. 28 illustrates exemplary operations of the receiver, in case a format of a transmission video and a display aspect ratio of the receiver are different.

In this drawing, an example of the format of the video that is being transmitted is shown on a furthermost right side column (A-1, B-1, C-1), the middle column shows exemplary operations (A-2, B-2, C-2) of the receiver, and the last column shows exemplary screens (A-3, A-4, B-3, B-4, C-3, C-4) that can be displayed in accordance with the operations of the receiver. For simplicity in the description, an exemplary transmission video format is given as 21:9, and an exemplary display of the receiver is given as 16:9.

For example, in case the transmission video has a video format of 21:9 (A-1), the receiver inserts a letterbox area (AFD bar) in the corresponding video in accordance with the display apparatus or its performance, and, then, the receiver performs scaling on the corresponding video (A-2). At this point, according to the exemplary signaling information, in case subtitle information does not exist (A-3), the receiver displays the letterbox area on top (or upper) and bottom (or lower) portions of the video, and, in case the subtitle information exists (A-4), the receiver may add the letterbox area to the bottom portion of the video and may display the subtitle information on the letterbox area.

As another example, in case the transmission video has a video format of 21:9 (A-2), the receiver crops the corresponding video (B-2) in accordance with the display apparatus or its performance. In case of the first exemplary embodiment (B-3), the receiver may decode the base layer data, the first enhancement layer data, and the second enhancement layer data, which are encoded either in relation with one another or independently, and may then display the decoded data on a display having the aspect ratio of 16:9. In this case, the second enhancement layer data may not be decoded or may not use the decoded data.

In case of the second exemplary embodiment (B-4), crop coordinates information, which is included in the signaling information, may be displayed on the display of a 16:9 screen.

As yet another example, although the transmission video has a format of 21:9, in case the transmission video has a video format of 16:9, wherein a video format of 21:9 and an AFD bar image are added to the video coding format of 16:9 (C-1), the receiver may directly display the received video (C-2).

At this point, the receiver may identify the 16:9 video coding format as an active format, which corresponds to a format having an AFD added to the video format 16:9, and may directly display the letterbox area on the top and bottom portions (C-3), and, if subtitles exist within the stream, the receiver may cut out (or crop) a bar area, which was initially inserted, and may add it to the bottom portion, and the receiver may then display subtitle information on the corresponding area (C-4).

FIG. 29 illustrates an exemplary case when the exemplary descriptors are included in another signaling information.

A table_id field indicates an identifier of the table.

A section_syntax_indicator field corresponds to a 1-bit field that is set to 1 with respect to a SDT table section (section_syntax_indicator: The section section_syntax_indicator is a 1-bit field which shall be set to "1")

A section_length field indicates a length of the section is a number of bytes (section_length: This is a 12-bit field, the first two bits of which shall be "00". It specifies the number of bytes of the section, starting immediately following the section_length field and including the CRC. The section_length shall not exceed 1 021 so that the entire section has a maximum length of 1 024 bytes.)

A transport_stream_id field differentiates from another multiplex within the transmitting system and then indicates a TS identifier, which is provided by the SDT (transport_stream_id: This is a 16-bit field which serves as a label for identification of the TS, about which the SDT informs, from any other multiplex within the delivery system.)

A version_number field indicates a version number of this sub table (version_number: This 5-bit field is the version number of the sub_table. The version_number shall be incremented by 1 when change in the information carried within the sub_table occurs. When it reaches value "31", it wraps around to "0". When the current_next_indicator is set to "1", then the version_number shall be that of the currently applicable sub_table. When the current_next_indicator is set to "0", then the version_number shall be that of the next applicable sub_table.)

A current_next_indicator field indicates whether this sub table is currently applicable or applicable next (current_next_indicator: This 1-bit indicator, when set to "1" indicates that the sub_table is the currently applicable sub_table.

When the bit is set to "0", it indicates that the sub_table sent is not yet applicable and shall be the next sub_table to be valid.)

A section_number field indicates a number of the section (section_number: This 8-bit field gives the number of the section. The section_number of the first section in the sub_table shall be "0x00". The section_number shall be incremented by 1 with each additional section with the same table_id, transport_stream_id, and original_network_id.)

A last_section_number field indicates a number of the last section (last_section_number: This 8-bit field specifies the number of the last section (that is, the section with the highest section_number) of the sub_table of which this section is part.)

An original_network_id field indicates an identifier of a network ID of the transmitting system (original_network_id: This 16-bit field gives the label identifying the network_id of the originating delivery system.)

A service_id field indicates a service identifier within the TS (service_id: This is a 16-bit field which serves as a label to identify this service from any other service within the TS. The service_id is the same as the program_number in the corresponding program_map_section.)

An EIT_schedule_flag field may indicate whether or not EIT schedule information respective to the service exists in the current TS (EIT_schedule_flag: This is a 1-bit field which when set to "1" indicates that EIT schedule information for the service is present in the current TS, see TR 101 211 [i.2] for information on maximum time interval between occurrences of an EIT schedule sub_table.) If the flag is set to 0 then the EIT schedule information for the service should not be present in the TS.)

An EIT_present_following_flag field may indicate whether or not EIT_present_following information information respective to the service exists within the present TS (EIT_present_following_flag: This is a 1-bit field which when set to "1" indicates that EIT_present_following information for the service is present in the current TS, see TR 101 211 [i.2] for information on maximum time interval between occurrences of an EIT present/following sub_table. If the flag is set to 0 then the EIT present/following information for the service should not be present in the TS)

A running_status field may indicate a status of the service, which is define in Table 6 of the DVB-SI document (running_status: This is a 3-bit field indicting the status of the service as defined in table 6. For an NVOD reference service the value of the running_status shall be set to "0".)

A free_CA_mode field indicates whether or not all component streams of the service are scrambled (free_CA_mode: This 1-bit field, when set to "0" indicates that all the component streams of the service are not scrambled. When set to "1" it indicates that access to one or more streams may be controlled by a CA system.)

A descriptors_loop_field indicates a length of an immediately successive descriptor (descriptors_loop_length: This 12-bit field gives the total length in bytes of the following descriptors).

CRC_32 corresponds to a 32-but field including a CRC value (CRC_32: This is a 32-bit field that contains the CRC value that gives a zero output of the registers in the decoder)

The descriptors_loop_length field may include the UHD_program_type_descriptor, which is given as an example in FIG. 16, and the UHD_composition_descriptor, which is given as an example in FIG. 18, FIG. 24, or FIG. 25 according to the exemplary embodiment of the present invention, in the following descriptor locations.

In case the UHD_composition_descriptor is included in the SDT of the DVB, the UHD_composition_descriptor may further include a component_tag field. The component_tag field may indicate a PID value respective to the corresponding stream signaled from the PMT, which corresponds to a PSI level. The receiver may find (or locate) the PID value of the corresponding stream along with the PMT by using the component_tag field FIG. 30 illustrates an exemplary case when the exemplary descriptors are included in another signaling information. This drawing illustrates an exemplary case when the exemplary descriptors are included in an EIT.

The EIT may follow ETSI EN 300 468. By using this, each field will hereinafter be described as shown below.

A table_id field indicates an identifier of the table.

A section_syntax_indicator field corresponds to a 1-bit field that is set to 1 with respect to a EIT table section (section_syntax_indicator: The section section_syntax_indicator is a 1-bit field which shall be set to "1")

A section_length field indicates a length of the section is a number of bytes (section_length: This is a 12-bit field. It specifies the number of bytes of the section, starting immediately following the section_length field and including the CRC. The section_length shall not exceed 4 093 so that the entire section has a maximum length of 4 096 bytes.)

A service_id field indicates a service identifier within the TS (service_id: This is a 16-bit field which serves as a label to identify this service from any other service within a TS. The service_id is the same as the program_number in the corresponding program_map_section.)

A version_number field indicates a version number of this sub table (version_number: This 5-bit field is the version number of the sub_table. The version_number shall be incremented by 1 when change in the information carried within the sub_table occurs. When it reaches value 31, it wraps around to 0. When the current_next_indicator is set to "1", then the version_number shall be that of the currently applicable sub_table. When the current_next_indicator is set to "0", then the version_number shall be that of the next applicable sub_table.)

A current_next_indicator field indicates whether this sub table is currently applicable or applicable next (current_next_indicator: This 1-bit indicator, when set to "1" indicates that the sub_table is the currently applicable sub_table. When the bit is set to "0", it indicates that the sub_table sent is not yet applicable and shall be the next sub_table to be valid.)

A section_number field indicates a number of the section (section_number: This 8-bit field gives the number of the section. The section_number of the first section in the sub_table shall be "0x00". The section_number shall be incremented by 1 with each additional section with the same table_id, service_id, transport_stream_, and original_network_id. In this case, the sub_table may be structured as a number of segments. Within each segment the section_number shall increment by 1 with each additional section, but a gap in numbering is permitted between the last section of segment and the first section of the adjacent segment.)

A last_section_number field indicates a number of the last section (last_section_number: This 8-bit field specifies the number of the last section (that is, the section with the highest section_number) of the sub_table of which this section is part.)

A transport_stream_id field differentiates from another multiplex within the transmitting system and then indicates a TS identifier, which is provided by the SDT (transport_stream_id: This is a 16-bit field which serves as a label for identification of the TS, about which the EIT informs, from any other multiplex within the delivery system.)

An original_network_id field indicates an identifier of a network ID of the transmitting system (original_network_id: This 16-bit field gives the label identifying the network_id of the originating delivery system.)

A segment_last_section_number field indicates a last section number of this segment of this sub table (segment_last_section_number: This 8-bit field specifies the number of the last section of this segment of the sub_table. For sub_tables which are not segmented, this field shall be set to the same value as the last_section_number field.)

A last_table_id field is (last_table_id: This 8-bit field identifies the last table_id used (see table 2).)

An event_id field indicates an identification number of an event. (event_id: This 16-bit field contains the identification number of the described event (uniquely located within a service definition)

A start_time field includes a start time of an event (start_time: This 40-bit field contains the start time of the event in Universal Time, Co-ordinated (UTC) and Modified Julian Date (MJD) (see annex C). This field is coded as 16 bits giving the 16 LSBs of MJD followed by 24 bits coded as 6 digits in 4-bit Binary Coded Decimal (BCD). If the start time is undefined (e.g. for an event in a NVOD reference service) all bits of the field are set to "1".)

A running_status field may indicate a status of the event, which is defined in Table 6 of the DVB-SI document (running_status: This is a 3-bit field indicting the status of the service as defined in table 6. For an NVOD reference event the value of the running_status shall be set to "0".)

A free_CA_mode field indicates whether or not all component streams of the service are scrambled (free_CA_mode: This 1-bit field, when set to "0" indicates that all the component streams of the service are not scrambled. When set to "1" it indicates that access to one or more streams may be controlled by a CA system.)

A descriptors_loop_field indicates a length of an immediately successive descriptor (descriptors_loop_length: This 12-bit field gives the total length in bytes of the following descriptors.)

CRC_32 corresponds to a 32-but field including a CRC value (CRC_32: This is a 32-bit field that contains the CRC value that gives a zero output of the registers in the decoder)

The descriptors_loop_length field may include the UHD_program_type_descriptor, which is given as an example in FIG. 16, and the UHD_composition_descriptor, which is given as an example in FIG. 18, FIG. 24, or FIG. 25 according to the exemplary embodiment of the present invention, in the following descriptor locations.

In case the UHD_composition_descriptor is included in the EIT of the DVB, the UHD_composition_descriptor may further include a component_tag field. The component_tag field may indicate a PID value respective to the corresponding stream signaled from the PMT, which corresponds to a PSI level. The receiver may find (or locate) the PID value of the corresponding stream along with the PMT by using the component_tag field.

FIG. 31 illustrates an exemplary case when the exemplary descriptors are included in another signaling information.

The VCT may follow an ATSC PSIP standard. According to ATSC PSIP, the description of each field is as follows. The description of each bit is disclosed as described below.

A table_id field indicates an 8-bit unsigned integer, which indicates a type of a table section. (table_id—An 8-bit unsigned integer number that indicates the type of table section being defined here. For the terrestrial_virtual_channel_table_section( ) the table_id shall be 0xC8)

A section_syntax_indicator field corresponds to a 1-bit field, which is set to 1 with respect to a VCT table section (section_syntax_indicator—The section_syntax_indicator is a one-bit field which shall be set to '1' for the terrestrial_virtual_channel_table_section( )).

A private_indicator field is set to 1 (private_indicator—This 1-bit field shall be set to '1')

A section_length field indicates a length of a section in a number of bytes. (section_length—This is a twelve bit field, the first two bits of which shall be '00'. It specifies the number of bytes of the section, starting immediately following the section_length field, and including the CRC.)

A transport_stream_id field indicates a MPEG-TS ID as in the PMT, which can identify the TVCT (transport_stream_id—The 16-bit MPEG-2 Transport Stream ID, as it appears in the Program Association Table (PAT) identified by a PID value of zero for this multiplex. The transport_stream_id distinguishes this Terrestrial Virtual Channel Table from others that may be broadcast in different PTCs.)

A version_number field indicates a version number of the VCT (version_number—This 5 bit field is the version number of the Virtual Channel Table. For the current VCT (current_next_indicator='1'), the version number shall be incremented by 1 whenever the definition of the current VCT changes. Upon reaching the value 31, it wraps around to 0. For the next VCT (current_next_indicator='0'), the version number shall be one unit more than that of the current VCT (also in module 32 arithmetic). In any case, the value of the version_number shall be identical to that of the corresponding entries in the MGT)

A current_next_indicator field indicates whether this VCT table is currently applicable or applicable next (current_next_indicator—A one-bit indicator, which when set to '1' indicates that the Virtual Channel Table sent is currently applicable. When the bit is set to '0', it indicates that the table sent is not yet applicable and shall be the text table to become valid. This standard imposes no requirement that "next" tables (those with current_next_indicator set to '0') must be sent. An update to the currently applicable table shall be signaled by incrementing the version_number field)

A section_number field indicates a number of a section (section_number—This 8 bit field gives the number of this section. The section_number of the first section in the Terrestrial Virtual Channel Table shall be 0x00. It shall be incremented by one with each additional section in the Terrestrial Virtual Channel Table)

A last_section_number field indicates a number of the last section (last_section_number—This 8 bit field specifies the number of the last section (that is, the section with the highest section_number) of the complete Terrestrial Virtual Channel Table.)

A protocol_version field indicates a protocol version for parameters that are to be defined differently from the current protocols in a later process (protocol_version—An 8-bit unsigned integer field whose function is to allow, in the future, this table type to carry parameters that may be structured differently than those defined in the current protocol. At present, the only valid value for protocol_version is zero. Non-zero values of protocol_version may be used by a future version of this standard to indicate structurally different tables)

A num_channels_in_section field indicates a number of virtual channels in this VCT (num_channels_in_section—

This 8 bit field specifies the number of virtual channels in this VCT section. The number is limited by the section length)

A short_name field indicates a name of the virtual channel (short_name—The name of the virtual channel, represented as a sequence of one to seven 16-bit code values interpreted in accordance with the UTF-16 representation of Unicode character data. If the length of the name requires fewer than seven 16-bit code values, this field shall be padded out to seven 16-bit code values using the Unicode NUL character (0x0000). Unicode character data shall conform to The Unicode Standard, Version 3.0 [13].)

A major_channel_number field indicates a number of major channels related to the virtual channel (major_channel_number—A 10-bit number that represents the "major" channel number associated with the virtual channel being defined in this iteration of the 'for' loop. Each virtual channel shall be associated with a major and a minor channel number. The major channel number, along with the minor channel number, act as the user's reference number for the virtual channel. The major_channel_number shall be between 1 and 99. The value of major_channel_number shall be set such that in no case is a major_channel_number/minor_channel_number pair duplicated within the TVCT. For major_channel_number assignments in the U.S., refer to Annex B.)

A minor_channel_number field indicates a number of minor channels related to the virtual channel (minor_channel_number—A 10-bit number in the range 0 to 999 that represents "minor" or "sub"-channel number. This field, together with major_channel_number, performs as a two-part channel number, where minor_channel_number represents the second or right-hand part of the number. When the service_type is analog television, minor_channel_number shall be set to 0. Services whose service_type is ATSC_digital_television, ATSC_video_only, or unassociated/small screen service shall use minor numbers between 1 and 99. The value of minor_channel_number shall be set such that in no case is a major_channel_number/minor_channel_number pair duplicated within the TVCT. For other types of services, such as data broadcasting, valid minor virtual channel numbers are between 1 and 999.)

A modulation_mode mode indicates a modulation mode of a carrier related to the virtual channel (modulation_mode—An 8-bit unsigned integer number that indicates the modulation mode for the transmitted carrier associated with this virtual channel. Values of modulation_mode shall be as defined in Table 6.5. For digital signals, the standard values for modulation mode (values below 0x80) indicate transport framing structure, channel coding, interleaving, channel modulation, forward error correction, symbol rate, and other transmission-related parameters, by means of a reference to an appropriate standard. The modulation_mode field shall be disregarded for inactive channels)

A carrier_frequency field corresponds to a field that can identify a carrier frequency (carrier_frequency—The recommended value for these 32 bits is zero. Use of this field to identify carrier frequency is allowed, but is deprecated.)

A channel_TSID field indicates a MPEG-2 TS ID that is related to TS transmitting an MPEG-2 program, which is referenced by this virtual channel (channel_TSID—A 16-bit unsigned integer field in the range 0x0000 to 0xFFFF that represents the MPEG-2 Transport Stream ID associated with the Transport Stream carrying the MPEG-2 program reference by this virtual channel8. For inactive channel, channel_TSID shall represent the ID of the Transport Stream that will carry the service when it becomes active. The receiver is expected to use the channel_TSID to verify that any received Transport Stream is actually the desired multiplex. For analog channels (service_type 0x01), channel_TSID shall indicate the value of the analogTSID included in the VBI of the NTSC signal. Refer to Annex D Section 9 for a discussion on use of the analog TSID)

A program_number field indicates an integer value that is defined in relation with this virtual channel and PMT (program_number—A 16-bit unsigned integer number that associates the virtual channel being defined here with the MPEG-2 PROGRAM ASSOCIATION and TS PROGRAM MAP tables. For virtual channels representing analog services, a value of 0xFFFF shall be specified for program_number. For inactive channels (those not currently present in the Transport Stream), program_number shall be set to zero. This number shall not be interpreted as pointing to a Program Map Table entry.)

An ETM_location field indicates the presence and location (or position) of the ETM (ETM_location—This 2-bit field specifies the existence and the location of an Extended Text Message (ETM) and shall be as defined in Table 6.6.)

An access_controlled field may designate an event that is related to the access controlled virtual channel (access_controlled—A 1-bit Boolean flag that indicates, when set, that the events associated with this virtual channel may be access controlled. When the flag is set to '0', event access is not restricted)

A hidden field may indicate a case when the virtual channel is not accessed due to a direct channel input made by the user (hidden—A 1-bit Boolean flag that indicates, when set, that the virtual channel is not accessed by the user by direct entry of the virtual channel number. Hidden virtual channels are skipped when the user is channel surfing, and appear as if undefined, if accessed by direct channel entry. Typical applications for hidden channels are test signals and NVOD services. Whether a hidden channel and its events may appear in EPG displays depends on the state of the hide_guide bit.)

A hide_guide field may indicate whether or not the virtual channel and its events can be displayed on the EPG (hide_guide—A Boolean flag that indicates, when set to '0', for a hidden channel, that the virtual channel and its events may appear in EPG displays. This bit shall be ignored for channels which do not have the hidden bit set, so that non-hidden channels and their events may always be included in the EPG displays regardless of the state of the hide_guide bit. Typical applications for hidden channels with the hide_guide bit set to '1' are test signals and services accessible through application-level pointers.)

A service_type field indicates a service type identifier (service_type—This 6-bit field shall carry the Service Type identifier. Service Type and the associated service_type field are defined in A/53 Part 1[1] to identify the type of service carried in this virtual channel. Value 0x00 shall be reserved. Value 0x01 shall represent analog television programming Other values are defined in A/53 Part 3[3], and other ATSC Standards may define other Service Types9)

A source_id field corresponds to an identification number identifying a program source related to the virtual channel (source_id—A 16-bit unsigned integer number that identifies the programming service associated with the virtual channel. In this context, a source is one specific source of video, text, data, or audio programming Source ID value zero is reserved. Source ID values in the range 0x0001 to 0x0FFF shall be unique within the Transport Stream that carries the VCT, while values 0x1000 to 0xFFFF shall be unique at the regional level. Values for source_ids 0x1000 and above shall be issued and administered by a Registration Authority designated by the ATSC.)

A descriptors_length field indicates a length of a following (or subsequent) descriptor (descriptors_length—Total length (in bytes) of the descriptors for this virtual channel that follows)

Descriptors may be included in descriptor( ) (descriptor( )—Zero or more descriptors, as appropriate, may be included.)

In case a video service is being transmitted according to the exemplary embodiments of the present invention, the service_type field may be given a value indicating a parameterized service(0x07) or an extended parameterized service (0x09) or a scalable UHDTV service.

Additionally, the UHD_program_type_descriptor, which is given as an example in FIG. 16, and the UHD_composition_descriptor, which is given as an example in FIG. 18, FIG. 24, or FIG. 25 may be located in a descriptor location.

Hereinafter, in case video data are being transmitted according to the exemplary embodiments of the present invention, a syntax of the video data will be disclosed.

Figure 32:
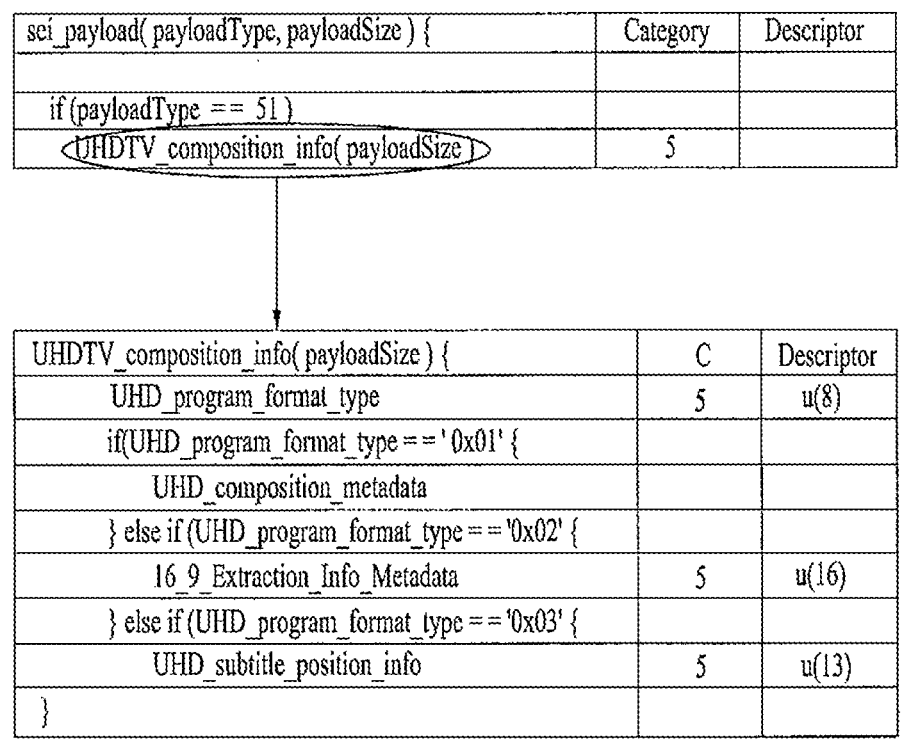
FIG. 32 illustrates an exemplary syntax of a payload of a SEI section of video data according to the exemplary embodiments of the present invention.

FIG. 32 illustrates an exemplary syntax of a payload of a SEI section of video data according to the exemplary embodiments of the present invention.

In a SEI payload, in case payloadType is set to a specific value (in this example, 51), information (UHD_composition_info(payload Size)) signaling the format of the video data as given in the example may be included.

The UHD_program_format_type is identical to the example shown in FIG. 16, and, herein, for example, in case the UHD_program_format_type is equal to 0x01, as an example indicating the first exemplary embodiment of the present invention, this indicates that the transmitted UHD video of 21:9 corresponds to a video format that can display the 16:9 HD video, the 16:9 UHD video, and an area representing a difference between the 21:9 UHD video and the 16:9 UHD video by using separate layer data.

At this point, the video data may include a UHD_composition_metadata value. This value is already given as an example in FIG. 18.

In case the UHD_program_format_type is equal to 0x02, as an example indicating the second exemplary embodiment of the present invention, this indicates that the transmitted UHD video of 21:9 corresponds to a video format that can be displayed by using crop information for the 21:9 video or the 16:9 video.

At this point, the video data may include a 16_9_Extraction_info_Metadata value. This value is already given as an example in FIG. 24.

In case the UHD_program_format_type is equal to 0x03, as an example indicating the third exemplary embodiment of the present invention, this indicates that the transmitted UHD video of 21:9 corresponds to a video format that can be displayed by using letterbox (AFDbar) information for the 16:9 video and the 21:9 video.

At this point, the video data may include a UHD_subtitle_position_info value. This value is already given as an example in FIG. 25.

A video decoder of the receiver may perform parsing of a UHDTV_composition_info SEI message, which is respectively given as an example as described above. The UHDTV_composition_info ( ) is received through a SEI RBSP (raw byte sequence payload), which corresponds to an encoded video data source.

The video decoder parses an AVC or HEVC NAL unit, and, in case the nal_unit_type value is equal to a value corresponding to the SEI data, the video decoder reads the UHDTV_composition_info SEI message having a payloadType of 51.

Additionally, by decoding the UHDTV_composition_info( ) which is given as an example in this drawing, UHD_composition information, 16:9 extraction information, or UHD_subtitle_position information respective to the current video data may be acquired. By using the information of the video data section, the receiver may determine the configuration information of the 16:9 HD and UHD and 21:9 UHD streams, thereby being capable of performing final output of the UHD video.

Accordingly, the receiver may determine video data according to the exemplary embodiment, which is disclosed in the present invention, from the signaling information section and the video data section, and, then, the receiver may convert the video format respectively and may display the converted video data to fit the receiver.

Figure 33:
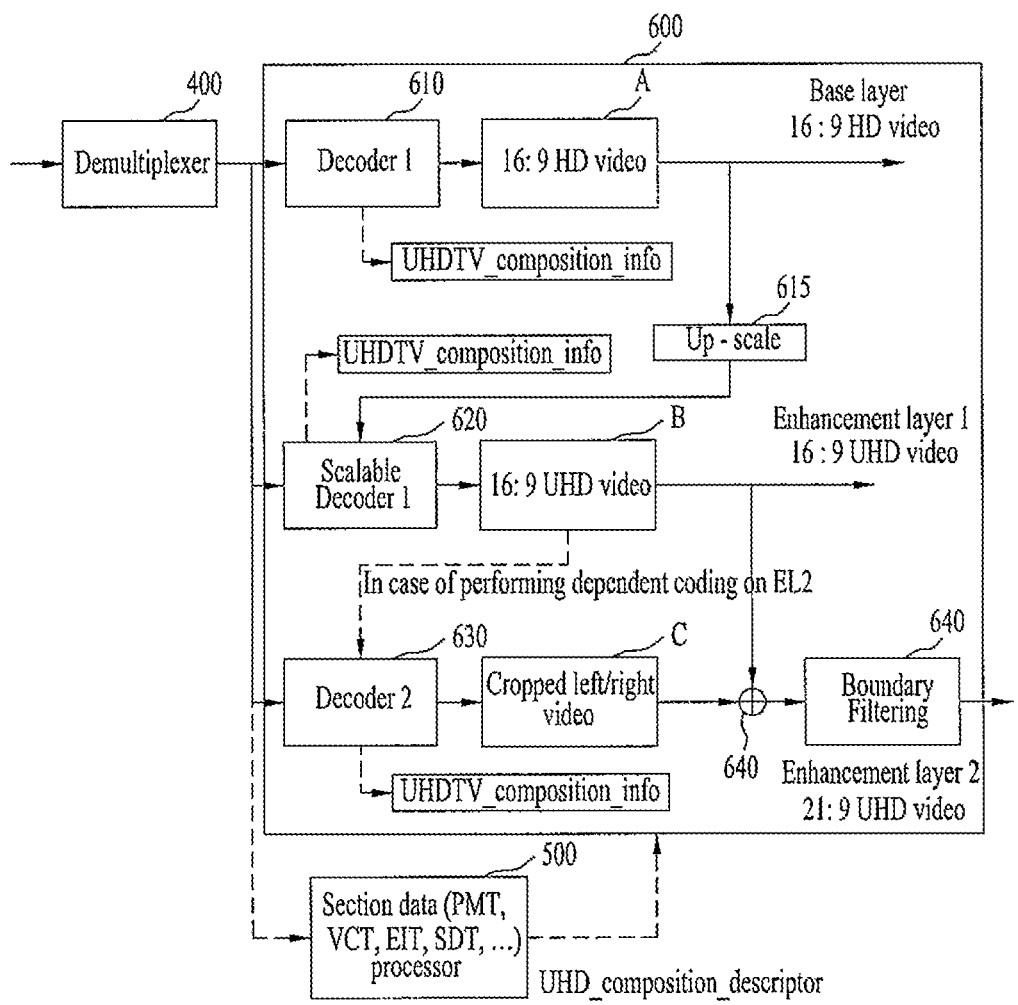
FIG. 33 illustrates an example of a receiving apparatus that can decode and display video data according to at least one exemplary embodiment of the present invention, in case the video data are transmitted according to the exemplary embodiments of the present invention.

FIG. 33 illustrates an example of a receiving apparatus that can decode and display video data according to at least one exemplary embodiment of the present invention, in case the video data are transmitted according to the exemplary embodiments of the present invention.

An example of a signal receiving apparatus according to the present invention may include a demultiplexer (400), a signaling information processing unit (500), and a video decoder (600).

The demultiplexer (400) may demultiplex each of the video streams and signaling information according to the exemplary embodiment of the present invention. For example, the video streams may include streams transmitting videos, which are given as examples in FIG. 2 to FIG. 5.

The signaling information processing unit (500) may decode the signaling information, which is given as an example in FIG. 16 to FIG. 27, FIG. 29 to FIG. 31, or may decode a part (or portion) of the signaling information depending upon the performance of the receiver. For example, the signaling information processing unit (500) may decode signaling information of at least one of the descriptors shown in FIG. 18, FIG. 24, and FIG. 25.

The video decoder (600) may decode the video data, which are demultiplexed by the demultiplexer (400) in accordance with the signaling information that is processed by the signaling information processing unit (500). In this case, the video data may be decoded by using coding information or signaling information of the video data respective to the syntax of the video data, which are given as an example in FIG. 32.

The video decoder (600) may include at least one video decoder among a first decoder (610), a second decoder (620), and a third decoder (630).

For example, according to the first exemplary embodiment of the present invention, the video decoder (600) may include a first decoder (610), a second decoder (620), and a third decoder (630).

The first decoder (610) may decode and output the demultiplexed 16:9 HD video. In this case, the first decoder (610) may decode the coding information (UHDTV_composition_info), which is given as an example in FIG. 32. The video data, which are decoded by the first decoder (610), may be outputted as 16:9 HD video data(A), which correspond to base layer data.

An up-scaler (615) may up-scale the 16:9 HD video data, which correspond to base layer data, so as to output 21:9 video data.

The second decoder (620) may perform scalable decoding by using the up-scaled base layer data and residual data. In this case, the second decoder (620) may decode the coding information (UHDTV_composition_info), which is given as an example in FIG. 32. The video data, which are decoded by the second decoder (620), may be outputted as 16:9 UHD video data(B), which correspond to second enhancement layer data.

The third decoder (630) may output the data that are cropped from the 21:9 video data as the decoded video data(C). The third decoder (630) may also perform decoding in association with the 16:9 UHD video data(B) in accordance with the coding method. Similarly, in this case, the first decoder (630) may decode the coding information (UHDTV_composition_info), which is given as an example in FIG. 32.

Additionally, a merging unit (640) may merge and output the 16:9 UHD video data(B), which are outputted from the second decoder (620), and the cropped data, which are outputted from the third decoder (630).

Furthermore, a filtering unit (640) may perform filtering on a merged portion of the video. The filtering method is given above as an example in FIG. 13 and Equation 1 to Equation 10.

Figure 34:
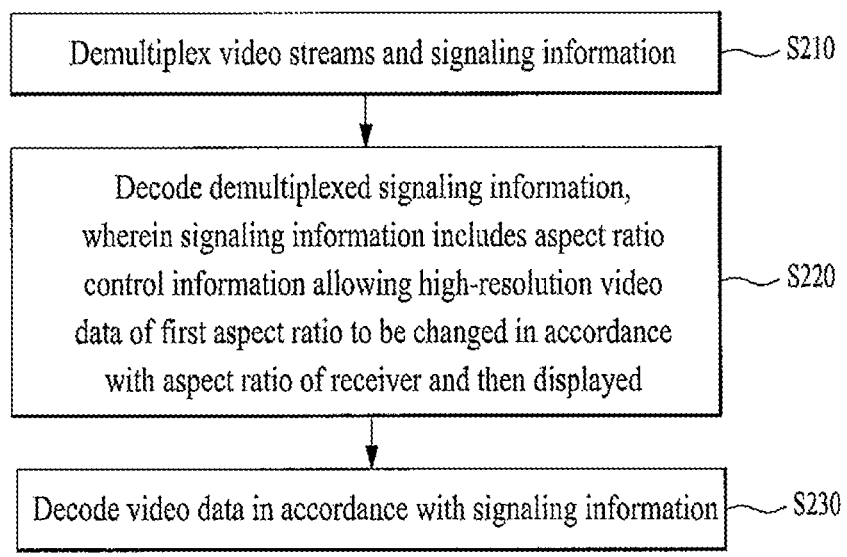
FIG. 34 illustrates a method for receiving signals according to an exemplary embodiment of the present invention.

FIG. 34 illustrates a method for receiving signals according to an exemplary embodiment of the present invention.

A signaling receiving method according to an exemplary embodiment of the present invention multiplexes video streams and signaling information (S210).

Video data being included in a video stream may have different structures depending upon the exemplary embodiments, and such exemplary embodiments may vary in accordance with FIGS. 2 and 3 (First embodiment), FIG. 4 (Second embodiment), FIG. 5 to FIG. 7 (Third embodiment). For example, the received video data may include data, which allow high-resolution video to be divided to fit the conventional (or already-existing) aspect ratio and transmitted accordingly, and which allow the divided data to be merged back to the high-resolution video. Alternatively, the received video data may include information allowing the high-resolution video data to be divided to fit the aspect ratio of the receiver or may also include position information of a letter for positioning subtitle information (e.g., AFD bar).

In case the signal being received corresponds to a broadcast signal, the signaling information, which is given as an example in FIG. 16 to FIG. 27 and in FIG. 29 to FIG. 31, may be demultiplexed separately from the video data.

In case the signal being received corresponds to a broadcast signal, the demultiplexed signaling information is decoded (S220). In case the received signal does not corresponds to a broadcast signal, step S220 is omitted, and the signaling information within the video data is decoded in the video data decoding step described below. The demultiplexed signaling information that is included in the broadcast signal may include diverse information, which are given as examples in FIG. 16 to FIG. 27 and in FIG. 29 to FIG. 31 according to the respective exemplary embodiment, and, herein, the diverse information, which are given as examples in the above-mentioned drawings according to the respective exemplary embodiment, may be decoded. The signaling information may include signaling information that signals displaying high-resolution video data having a first aspect ratio on the receiver regardless of the aspect ratio. For example, the signaling information that signals displaying high-resolution video data on the receiver regardless of the aspect ratio may include aspect ratio control information of the high-resolution video data.

Video data are decoded with respect to the signaling information according to the exemplary embodiment (S230). Video data information including coding information respective to a video data syntax, which is given as an example in FIG. 32, may be included in the video data. In case of decoding the video data, the corresponding video data may be outputted as decoded, or may be merged, or may be outputted after positioning subtitles therein. In case the received video data correspond to the high resolution being divided to fit the already-existing aspect ratio and transmitted accordingly, the signaling information may include data that can merge the received video data back to the high-resolution video. Alternatively, the signaling information may include information allowing the high-resolution video data to be divided to fit the aspect ratio of the receiver or may also include position information of a letter for positioning subtitle information (e.g., AFD bar).

More specifically, the receiver may change the high-resolution video data having the first aspect ratio in accordance with the aspect ratio of the receiver by using screen control information and may then be capable of displaying the changed data.

According to the first exemplary embodiment, the aspect ratio control information may include merging information indicating that the encoded video data are transmitted after being divided and merging the divided video data. According to the second exemplary embodiment, the aspect ratio control information may include division information that can divide the encoded video data to best fir the aspect ratio. And, according to the third exemplary embodiment, the aspect ratio control information may include position information for subtitle positioning, which allows subtitle positions of the video to be changed in accordance with the resolution of the video respective to the encoded video data.

Therefore, in case the transmitter transmits the video data in accordance with each exemplary embodiment, even in case there are several types of aspect ratios in the receiver display apparatus, or even in case there are several types of performed, the high-resolution video may be displayed in accordance with the aspect ratio of each corresponding display, or the subtitles may be displayed. Additionally, even in case of the legacy receiver, the high-resolution video data may be displayed in accordance with the aspect ratio of the corresponding receiver.

Figure 35:
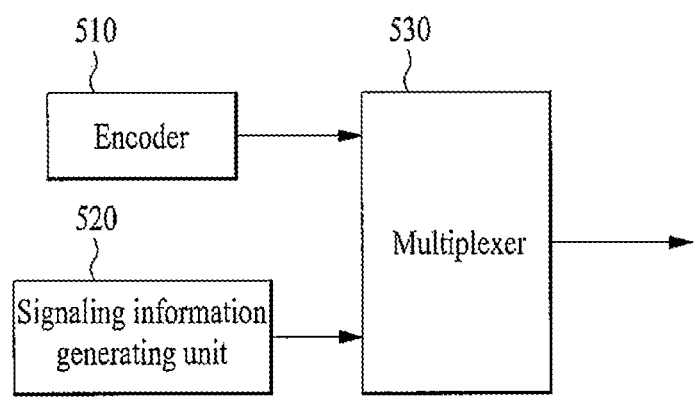
FIG. 35 illustrates an apparatus for transmitting signals according to an exemplary embodiment of the present invention.

FIG. 35 illustrates an apparatus for transmitting signals according to an exemplary embodiment of the present invention.

A signal transmitting apparatus according to an exemplary embodiment may include an encoder (510), a signaling information generating unit (520), and a multiplexer (530).

The encoder (510) encodes video data. In case of encoding the video data, according to the exemplary embodiment of the present invention, encoding information of the video data may be included in the encoded video data. The encoding information that can be included in the encoded video data has already been described above in detail in FIG. 32.

The encoded video data may have different structures depending upon the disclosed exemplary embodiments, and such exemplary embodiments may vary in accordance with FIGS. 2 and 3 (First embodiment), FIG. 4 (Second embodiment), FIG. 5 to FIG. 7 (Third embodiment).

For example, the encoded video data consists of a structure having high-resolution video divided to fit the conventional (or already-existing) aspect ratio and may include information, which allows the divided video data to be merged back to the high-resolution video. Alternatively, the encoded video data may include information allowing the high-resolution video data to be divided to fit the aspect ratio of the receiver or may also include position information of a letter for positioning subtitle information (e.g., AFD bar).

In case the transmitted signal corresponds to a broadcast signal, the signal transmitting apparatus according to an exemplary embodiment includes a signaling information generating unit (520), which is provided separately from the encoder (510). The signaling information generating unit (520) generates signaling information that signals displaying the encoded video data to fit the aspect ratio of the receiver. An example of the signaling information may include diverse information, which are given as examples in FIG. 16 to FIG. 27 and in FIG. 29 to FIG. 31 according to the respective exemplary embodiment, and, herein, the diverse information, which are given as examples in the drawings according to the respective exemplary embodiment, may be generated. The signaling information may include signaling information that signals displaying high-resolution video data having a first aspect ratio on the receiver regardless of the aspect ratio. For example, the signaling information that signals displaying high-resolution video data on the receiver regardless of the aspect ratio may include aspect ratio control information of the high-resolution video data.

The multiplexer (530) multiplexes the encoded video data and the signaling information and transmits the multiplexed video data and signaling information.

In case the transmitter transmits the video data in accordance with each exemplary embodiment, even in case there are several types of aspect ratios in the receiver display apparatus, or even in case there are several types of performed, the high-resolution video may be displayed in accordance with the aspect ratio of each corresponding display, or the subtitles may be displayed. Additionally, even in case of the legacy receiver, the high-resolution video data may be displayed in accordance with the aspect ratio of the corresponding receiver.

In case the transmitted data do not correspond to the broadcast signal, the signaling information generating unit (520), which generates signaling information that is multiplexed with the video data, may be omitted, and the multiplexer (530) multiplexes video data including only signaling information within an encoded video data section with other data (e.g., audio data) and outputs the multiplexed data.

Figure 36:
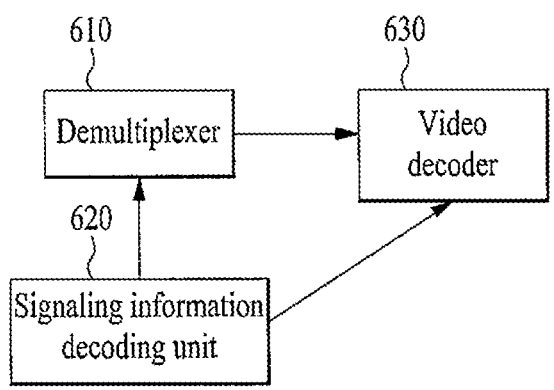
FIG. 36 illustrates an apparatus for receiving signals according to an exemplary embodiment of the present invention.

FIG. 36 illustrates an apparatus for receiving signals according to an exemplary embodiment of the present invention.

A signal receiving apparatus according to the exemplary embodiment may include a demultiplexer (610), a signaling information decoding unit (620), and a video decoder (630).

The demultiplexer (610) demultiplexes the video streams and the signaling information.

Video data being included in a video stream may have different structures depending upon the exemplary embodiments, and such exemplary embodiments may vary in accordance with FIGS. 2 and 3 (First embodiment), FIG. 4 (Second embodiment), FIG. 5 to FIG. 7 (Third embodiment). For example, the received video data may include data, which allow high-resolution video to be divided to fit the conventional (or already-existing) aspect ratio and transmitted accordingly, and which allow the divided data to be merged back to the high-resolution video. Alternatively, the received video data may include information allowing the high-resolution video data to be divided to fit the aspect ratio of the receiver or may also include position information of a letter for positioning subtitle information (e.g., AFD bar).

The signaling information decoding unit (620) decodes the demultiplexed signaling information. The demultiplexed signaling information may include diverse information, which are given as examples in FIG. 16 to FIG. 27 and in FIG. 29 to FIG. 31 according to the respective exemplary embodiment, and, herein, the diverse information, which are given as examples in the above-mentioned drawings according to the respective exemplary embodiment, may be decoded. The signaling information may include signaling information that signals displaying high-resolution video data having a first aspect ratio on the receiver regardless of the aspect ratio. For example, the signaling information that signals displaying high-resolution video data on the receiver regardless of the aspect ratio may include aspect ratio control information of the high-resolution video data.

The video decoder (630) decodes video data with respect to the signaling information according to the exemplary embodiment. Video data information including coding information respective to a video data syntax, which is given as an example in FIG. 32, may be included in the video data. In case of decoding the video data, the corresponding video data may be outputted as decoded, or may be merged, or may be outputted after positioning subtitles therein.

In case the received high-resolution video data are divided to fit the already-existing aspect ratio and transmitted accordingly, the aspect ratio control information may include data that can merge the received high-resolution video data back to the high-resolution video. Alternatively, the signaling information may include information allowing the high-resolution video data to be divided to fit the aspect ratio of the receiver or may also include position information of a letter for positioning subtitle information (e.g., AFD bar).

Therefore, in case the transmitter transmits the video data in accordance with each exemplary embodiment, even in case there are several types of aspect ratios in the receiver display apparatus, or even in case there are several types of performed, the high-resolution video may be displayed in accordance with the aspect ratio of each corresponding display, or the subtitles may be displayed. Additionally, even in case of the legacy receiver, the high-resolution video data may be displayed in accordance with the aspect ratio of the corresponding receiver.

Mode For Carrying Out The Present Invention

As described above, the mode for carrying out the present invention is described as a best mode for carrying out the present invention.

INDUSTRIAL APPLICABILITY

The present invention has an industrial applicability that can be used and repeatedly applied in the field of broadcasting and video signal processing.

What is claimed is:
1. A method for transmitting signals comprising:
encoding video data, wherein the encoded video data include UHD(ultra-high definition) video data for an UHD service;
wherein the video data is encoded to separate a first element for a base layer and a second element for an enhancement layer;
generating signaling information wherein the type information identifies High Efficiency Video Codec (HEVC) codec information of the UHD service; and
multiplexing the encoded video data and the signaling information and transmitting the multiplexed video data and the signaling information, wherein the multiplexed signaling information includes information on a video format and a resolution of the UHD service, wherein the multiplexed signaling information includes position information for designating a screen area and for displaying the UHD service being cropped in the screen area, and wherein the position information includes location information of an upper left position and a lower right positions of the screen area, wherein the first element corresponds to a high definition (HD) video and the second element corresponds to UHD video , and wherein the first element and the second element are encoded using scalable HEVC codec, and wherein the UHD video data includes a subtitle position information of a letter box in which subtitles are displayed.

2. The method of claim 1, wherein the signaling information further includes aspect ratio control information for combining the first and second elements of the UHD service, the aspect ratio control information includes merging information indicating that the encoded video data are divided and transmitted and merging the divided video data.

3. The method of claim 2, wherein the aspect ratio control information includes division information dividing the encoded video data to fit the aspect ratio.

4. An apparatus for transmitting signals comprising:

an encoder configured to encode video data, wherein the video data include UHD(ultra-high definition) video data for an UHD service;

wherein the video data is encoded to separate a first element for a base layer and a second element for an enhancement layer;

a signaling information generating unit configured to generate signaling information, wherein the signaling information includes type information based on codec information of the UHD service;

wherein the type information identifies High Efficiency Video Codec (HEVC) codec information of the UHD service and a multiplexer configured to multiplex the encoded video data and the signaling information, , wherein the multiplexed signaling information includes information on a video format and a resolution of the UHD service, wherein the multiplexed signaling information includes position information for designating a screen area and for displaying the UHD service being cropped in the screen area, and wherein the position information includes location information of an upper left position and a lower right positions of the screen area, wherein the first element corresponds to a high definition (HD) video and the second element corresponds to UHD video, and wherein the first element and the second element are encoded using scalable HEVC codec, and wherein the UHD video data includes a subtitle position information of a letter box in which subtitles are displayed.

5. The apparatus of claim 4, wherein the signaling information includes aspect ratio control information for combining the first and second elements of the UHD service, the aspect ratio control information includes merging information indicating that the encoded video data are divided and transmitted and merging the divided video data.

6. The apparatus of claim 5, wherein the aspect ratio control information includes division information dividing the encoded video data to fit the aspect ratio.

* * * * *